(12) United States Patent
Chrapko et al.

(10) Patent No.: US 10,380,703 B2
(45) Date of Patent: Aug. 13, 2019

(54) CALCULATING A TRUST SCORE

(71) Applicant: www.TrustScience.com Inc., Edmonton (CA)

(72) Inventors: Evan V Chrapko, Edmonton (CA); Leo M. Chan, Edmonton (CA); Shane Chrapko, Edmonton (CA); Stephen Marsh, Dalkeith (CA); Ashif Mawji, Edmonton (CA)

(73) Assignee: WWW.TRUSTSCIENCE.COM INC., Edmonton (CA)

( * ) Notice: Subject to any disclaimer, the term of this patent is extended or adjusted under 35 U.S.C. 154(b) by 0 days.

(21) Appl. No.: 15/400,471

(22) Filed: Jan. 6, 2017

(65) Prior Publication Data

US 2017/0301038 A1    Oct. 19, 2017

Related U.S. Application Data

(63) Continuation of application No. 14/664,285, filed on Mar. 20, 2015, now Pat. No. 9,578,043.

(51) Int. Cl.
*G06Q 50/00* (2012.01)
*G06Q 20/40* (2012.01)
(Continued)

(52) U.S. Cl.
CPC ............. *G06Q 50/01* (2013.01); *G06F 7/026* (2013.01); *G06Q 20/401* (2013.01);
(Continued)

(58) Field of Classification Search
CPC .. G06Q 20/401; G06Q 20/4016; G06Q 50/01; H04L 12/588; H04L 51/32
See application file for complete search history.

(56) References Cited

U.S. PATENT DOCUMENTS

| 5,555,542 A | 9/1996 | Ogura et al. |
| 6,108,308 A | 8/2000 | Flavin et al. |

(Continued)

FOREIGN PATENT DOCUMENTS

| CA | 2600344 | 9/2006 |
| CA | 2600344 A1 | 9/2006 |

(Continued)

OTHER PUBLICATIONS

International Search Report and Written Opinion for International Patent Application No. PCT/CA2016/050305 dated Jun. 3, 2016, 8 pages.

(Continued)

*Primary Examiner* — Daniel B Potratz
(74) *Attorney, Agent, or Firm* — Amin, Turocy & Watson, LLP

(57) ABSTRACT

Systems, devices, and methods are described herein for calculating a trust score. The trust score may be calculated between entities including, but not limited to, human users, groups of users, organizations, or businesses/corporations. A system trust score may be calculated for an entity by combining a variety of factors, including verification data, a network connectivity score, publicly available information, and/or ratings data. A peer trust score targeted from a first entity to a second entity may also be calculated based on the above factors. In some embodiments, the peer trust score may be derived from the system trust score for the target entity and may take into account additional factors, including social network connections, group/demographic info, and location data. Finally, a contextual trust score may be calculated between the first and second entities based on a type of transaction or activity to be performed between the two entities.

30 Claims, 20 Drawing Sheets

(51) Int. Cl.
*H04L 29/06* (2006.01)
*G06F 7/02* (2006.01)
*G06Q 30/02* (2012.01)
*G06Q 40/02* (2012.01)

(52) U.S. Cl.
CPC ..... *G06Q 20/4016* (2013.01); *H04L 63/1408* (2013.01); *G06Q 30/0282* (2013.01); *G06Q 40/025* (2013.01)

(56) References Cited

U.S. PATENT DOCUMENTS

| | | |
|---|---|---|
| 6,286,007 B1 | 9/2001 | Miller et al. |
| 6,356,902 B1 | 3/2002 | Tan et al. |
| 6,446,048 B1 | 9/2002 | Wells et al. |
| 6,509,898 B2 | 1/2003 | Chi et al. |
| 6,633,886 B1 | 10/2003 | Chong |
| 6,708,308 B2 | 3/2004 | De Souza et al. |
| 6,738,777 B2 | 5/2004 | Bliss et al. |
| 6,751,729 B1 | 6/2004 | Giniger et al. |
| 6,823,299 B1 | 11/2004 | Contreras |
| 7,069,259 B2 | 6/2006 | Horvitz et al. |
| 7,086,085 B1 | 8/2006 | Brown et al. |
| 7,130,262 B1 | 10/2006 | Cortez et al. |
| 7,130,908 B1 | 10/2006 | Pecus et al. |
| 7,139,837 B1 | 11/2006 | Parekh et al. |
| 7,266,649 B2 | 9/2007 | Yoshida et al. |
| 7,272,719 B2 | 9/2007 | Bleckmann et al. |
| 7,451,365 B2 | 11/2008 | Wang et al. |
| 7,512,612 B1 | 3/2009 | Akella et al. |
| 7,539,697 B1 | 5/2009 | Akella et al. |
| 7,664,802 B2 | 2/2010 | Aaltonen et al. |
| 7,668,665 B2 | 2/2010 | Kim |
| 7,685,192 B1 | 3/2010 | Scofield et al. |
| 7,743,208 B2 | 6/2010 | Yoshida et al. |
| 7,822,631 B1 * | 10/2010 | Vander Mey ..... G06F 17/30038 705/7.29 |
| 7,856,449 B1 * | 12/2010 | Martino ................ H04L 67/306 707/784 |
| 7,865,551 B2 | 1/2011 | McCuller |
| 7,886,334 B1 | 2/2011 | Walsh et al. |
| 7,930,255 B2 | 4/2011 | Choi et al. |
| 8,010,458 B2 | 8/2011 | Galbreath et al. |
| 8,010,460 B2 * | 8/2011 | Work .................... G06Q 10/00 705/319 |
| 8,108,536 B1 | 1/2012 | Hernacki et al. |
| 8,156,558 B2 | 4/2012 | Goldfeder et al. |
| 8,170,958 B1 | 5/2012 | Gremett et al. |
| 8,180,804 B1 | 5/2012 | Narayanan et al. |
| 8,214,883 B2 | 7/2012 | Obasanjo et al. |
| 8,234,688 B2 | 7/2012 | Grandison et al. |
| 8,244,848 B1 | 8/2012 | Narayanan et al. |
| 8,261,078 B2 | 9/2012 | Barriga et al. |
| 8,301,617 B2 | 10/2012 | Muntz et al. |
| 8,306,973 B2 | 11/2012 | Ohazama et al. |
| 8,316,056 B2 | 11/2012 | Wable |
| 8,392,590 B2 | 3/2013 | Bouchard et al. |
| 8,443,366 B1 | 5/2013 | Yancey |
| 8,468,103 B2 | 6/2013 | Galbreath et al. |
| 8,489,641 B1 | 7/2013 | Seefeld et al. |
| 8,516,196 B2 | 8/2013 | Jain et al. |
| 8,572,129 B1 | 10/2013 | Lee et al. |
| 8,601,025 B1 | 12/2013 | Shajenko et al. |
| 8,606,721 B1 | 12/2013 | Dicker |
| 8,682,837 B2 | 3/2014 | Skelton |
| 8,683,423 B2 | 3/2014 | Amaral et al. |
| 8,688,701 B2 | 4/2014 | Ghosh et al. |
| 8,832,093 B2 | 9/2014 | Redstone et al. |
| 8,832,790 B1 * | 9/2014 | Villa .................... H04L 63/123 726/2 |
| 8,949,250 B1 | 2/2015 | Garg et al. |
| 9,143,503 B2 | 9/2015 | Lo et al. |
| 9,154,491 B1 | 10/2015 | Leske |
| 9,223,978 B2 | 12/2015 | Kraemer |
| 9,319,419 B2 | 4/2016 | Sprague et al. |
| 9,390,243 B2 * | 7/2016 | Dhillon .................. G06Q 50/01 |
| 9,438,619 B1 | 9/2016 | Chan et al. |
| 9,443,004 B2 | 9/2016 | Chan |
| 9,443,044 B2 | 9/2016 | Gou et al. |
| 9,584,540 B1 | 2/2017 | Chan et al. |
| 9,721,296 B1 | 8/2017 | Chrapko |
| 2003/0046280 A1 | 3/2003 | Rotter et al. |
| 2003/0076825 A1 | 4/2003 | Guruprasad |
| 2003/0133411 A1 | 7/2003 | Ise et al. |
| 2003/0227924 A1 | 12/2003 | Kodialam et al. |
| 2004/0018518 A1 | 1/2004 | Krieb et al. |
| 2004/0088147 A1 | 5/2004 | Wang et al. |
| 2004/0122803 A1 | 6/2004 | Dom et al. |
| 2004/0181461 A1 | 9/2004 | Raiyani et al. |
| 2004/0181518 A1 | 9/2004 | Mayo et al. |
| 2004/0239674 A1 | 12/2004 | Ewald et al. |
| 2005/0083936 A1 | 4/2005 | Ma |
| 2005/0096987 A1 | 5/2005 | Miyauchi |
| 2005/0243736 A1 | 11/2005 | Faloutsos et al. |
| 2005/0256949 A1 | 11/2005 | Gruhl et al. |
| 2006/0212931 A1 | 9/2006 | Shull et al. |
| 2006/0271564 A1 | 11/2006 | Meng Muntz et al. |
| 2006/0287842 A1 | 12/2006 | Kim |
| 2006/0290697 A1 | 12/2006 | Madden et al. |
| 2006/0294134 A1 | 12/2006 | Berkhim et al. |
| 2007/0109302 A1 | 5/2007 | Tsuboshita et al. |
| 2007/0124291 A1 | 5/2007 | Hassan et al. |
| 2007/0136086 A1 | 6/2007 | Luerssen |
| 2007/0143629 A1 | 6/2007 | Hardjono et al. |
| 2007/0162761 A1 | 7/2007 | Davis et al. |
| 2007/0180495 A1 | 8/2007 | Hardjono et al. |
| 2007/0214259 A1 | 9/2007 | Ahmed et al. |
| 2007/0220146 A1 | 9/2007 | Suzuki |
| 2007/0263012 A1 | 11/2007 | Panditharadhya et al. |
| 2007/0282886 A1 | 12/2007 | Purang et al. |
| 2008/0005096 A1 | 1/2008 | Moore |
| 2008/0015916 A1 | 1/2008 | Cossey et al. |
| 2008/0086442 A1 | 4/2008 | Dasdan et al. |
| 2008/0101343 A1 | 5/2008 | Monette et al. |
| 2008/0104225 A1 | 5/2008 | Zhang et al. |
| 2008/0133391 A1 | 6/2008 | Kurian et al. |
| 2008/0183378 A1 | 7/2008 | Weidner |
| 2008/0288457 A1 | 11/2008 | Aaltonen et al. |
| 2008/0288612 A1 | 11/2008 | Kwon |
| 2009/0024629 A1 | 1/2009 | Miyauchi |
| 2009/0027392 A1 | 1/2009 | Jadhav et al. |
| 2009/0043489 A1 | 2/2009 | Weidner |
| 2009/0063157 A1 | 3/2009 | Seo |
| 2009/0064293 A1 | 3/2009 | Li et al. |
| 2009/0094134 A1 | 4/2009 | Toomer |
| 2009/0106822 A1 | 4/2009 | Obasanjo et al. |
| 2009/0198562 A1 | 8/2009 | Wiesinger et al. |
| 2009/0276233 A1 | 11/2009 | Brimhall et al. |
| 2009/0296568 A1 | 12/2009 | Kitada |
| 2009/0327054 A1 | 12/2009 | Yao et al. |
| 2010/0004940 A1 | 1/2010 | Choi et al. |
| 2010/0010826 A1 | 1/2010 | Rosenthal et al. |
| 2010/0043055 A1 * | 2/2010 | Baumgart .............. G06Q 20/12 726/2 |
| 2010/0076987 A1 | 3/2010 | Schreiner |
| 2010/0106557 A1 | 4/2010 | Buss |
| 2010/0169137 A1 | 7/2010 | Jastrebski et al. |
| 2010/0180048 A1 | 7/2010 | Guo et al. |
| 2010/0205541 A1 | 8/2010 | Rapaport et al. |
| 2010/0217525 A1 | 8/2010 | King et al. |
| 2010/0250605 A1 | 9/2010 | Pamu et al. |
| 2010/0262610 A1 | 10/2010 | Acosta et al. |
| 2010/0274815 A1 | 10/2010 | Vanasco |
| 2010/0309915 A1 | 12/2010 | Pirbhai et al. |
| 2011/0029467 A1 | 2/2011 | Spehr et al. |
| 2011/0055897 A1 | 3/2011 | Arasaratnam |
| 2011/0113098 A1 | 5/2011 | Walsh et al. |
| 2011/0173344 A1 | 7/2011 | Mihaly et al. |
| 2011/0208866 A1 | 8/2011 | Marmolejo-Meillon et al. |
| 2011/0219034 A1 | 9/2011 | Dekker et al. |
| 2011/0246237 A1 | 10/2011 | Vdovjak |
| 2011/0246412 A1 | 10/2011 | Skelton |
| 2011/0265011 A1 | 10/2011 | Taylor et al. |
| 2011/0283205 A1 | 11/2011 | Nie et al. |

(56) References Cited

U.S. PATENT DOCUMENTS

| | | | |
|---|---|---|---|
| 2011/0295626 A1 | 12/2011 | Chen et al. | |
| 2012/0182822 A1 | 6/2012 | Hayashi | |
| 2012/0182882 A1 | 7/2012 | Chrapko et al. | |
| 2012/0197758 A1* | 8/2012 | Zhong | G06Q 30/02 705/26.35 |
| 2012/0204265 A1 | 8/2012 | Judge | |
| 2012/0282884 A1 | 11/2012 | Sun | |
| 2012/0317149 A1 | 12/2012 | Jagota et al. | |
| 2012/0317200 A1 | 12/2012 | Chan | |
| 2013/0013807 A1* | 1/2013 | Chrapko | H04L 41/12 709/238 |
| 2013/0054598 A1 | 2/2013 | Caceres | |
| 2013/0073387 A1 | 3/2013 | Heath | |
| 2013/0097184 A1 | 4/2013 | Berkhim et al. | |
| 2013/0110732 A1 | 5/2013 | Uppal | |
| 2013/0124542 A1 | 5/2013 | Lee et al. | |
| 2013/0166601 A1 | 6/2013 | Chrapko et al. | |
| 2013/0173457 A1 | 7/2013 | Chrapko et al. | |
| 2013/0198811 A1 | 8/2013 | Yu | |
| 2013/0282884 A1 | 10/2013 | Chandrasekaran et al. | |
| 2013/0291098 A1 | 10/2013 | Chung et al. | |
| 2013/0332740 A1 | 12/2013 | Sauve et al. | |
| 2014/0081652 A1 | 3/2014 | Klindworth | |
| 2014/0089189 A1* | 3/2014 | Vasireddy | G06Q 20/4016 705/44 |
| 2014/0114962 A1 | 4/2014 | Rosenburg et al. | |
| 2014/0156274 A1 | 6/2014 | You et al. | |
| 2014/0172708 A1 | 6/2014 | Chrapko et al. | |
| 2014/0173723 A1 | 6/2014 | Singla et al. | |
| 2014/0258160 A1 | 9/2014 | Chrapko et al. | |
| 2014/0278730 A1 | 9/2014 | Muhart et al. | |
| 2014/0279352 A1 | 9/2014 | Schaefer et al. | |
| 2014/0280151 A1 | 9/2014 | Micaelian | |
| 2014/0287725 A1 | 9/2014 | Lee | |
| 2014/0317003 A1 | 10/2014 | Shah | |
| 2014/0317107 A1 | 10/2014 | Gharpure et al. | |
| 2015/0026120 A1 | 1/2015 | Chrapko et al. | |
| 2015/0089568 A1 | 3/2015 | Sprague et al. | |
| 2015/0121456 A1 | 4/2015 | Milman et al. | |
| 2015/0142595 A1* | 5/2015 | Acuna-Rohter | G06Q 20/40 705/21 |
| 2015/0220835 A1 | 8/2015 | Wilson et al. | |
| 2015/0242856 A1* | 8/2015 | Dhurandhar | G06Q 50/01 705/44 |
| 2015/0271206 A1 | 9/2015 | Schultz et al. | |
| 2015/0359039 A1 | 12/2015 | Haque et al. | |
| 2015/0370801 A1 | 12/2015 | Shah | |
| 2016/0035046 A1 | 2/2016 | Gupta et al. | |
| 2016/0073271 A1 | 3/2016 | Schultz et al. | |
| 2016/0171011 A1 | 6/2016 | Drogobetski et al. | |
| 2016/0171113 A1 | 6/2016 | Fanous et al. | |
| 2016/0277424 A1 | 9/2016 | Mawji et al. | |
| 2017/0236078 A1 | 8/2017 | Rasumov | |

FOREIGN PATENT DOCUMENTS

| | | |
|---|---|---|
| CA | 2775899 | 4/2011 |
| CA | 2775899 A1 | 4/2011 |
| CN | 1619567 | 5/2005 |
| CN | 101393566 A | 3/2009 |
| CN | 101403978 A | 4/2009 |
| CN | 101443806 A | 5/2009 |
| EP | 1511232 | 3/2005 |
| JP | 2001298453 | 10/2001 |
| JP | 2003259070 | 9/2003 |
| JP | 2006260099 | 9/2003 |
| JP | 2006113900 A | 4/2006 |
| JP | 2007004411 | 1/2007 |
| JP | 2007249413 | 9/2007 |
| JP | 2008129990 | 6/2008 |
| JP | 2009025871 | 2/2009 |
| JP | 2009064433 | 3/2009 |
| JP | 2009146253 A | 7/2009 |
| WO | 2006019752 | 2/2006 |
| WO | 2006115919 A2 | 11/2006 |
| WO | 2009002193 | 12/2008 |
| WO | 2009020964 | 2/2009 |
| WO | 2009109009 | 9/2009 |
| WO | 2010048172 | 4/2010 |
| WO | 2011143761 | 11/2011 |
| WO | 2013026095 | 2/2013 |
| WO | 2013026095 A1 | 2/2013 |
| WO | 2013173790 A1 | 11/2013 |

OTHER PUBLICATIONS

Notice of Allowance for U.S. Appl. No. 13/695,419 dated Nov. 8, 2017, 92 pages.

Final Office Action for U.S. Appl. No. 13/824,324, dated Nov. 30, 2017, 33 pages.

Decision to Grant a Patent and English Translation thereof dated Nov. 14, 2017 for Japanese Patent Application No. 2016-131310, 6 pages.

International Search Report and Written Opinion for International Patent Application No. PCT/CA2010/001531 dated Jan. 10, 2011, 9 pages.

Notification of Reasons for Refusal and English Translation thereof dated Mar. 29, 2016 for Japanese Patent Application No. 2015-085003, 4 pages.

Decision to Grant a Patent and English Translation thereof dated Jun. 2, 2016 for Japanese Patent Application No. 2015-085003, 6 pages.

Notification of Reasons for Refusal and English Translation thereof dated Apr. 3, 2014 for Japanese Patent Application No. 2012-531192, 7 pages.

Decision to Grant a Patent and English Translation thereof dated Feb. 16, 2015 for Japanese Patent Application No. 2012-531192, 6 pages.

Extended European Search Report for European Patent Application No. 10819770.8 dated Oct. 9, 2014, 7 pages.

Communication pursuant to Rules 70(2) for European Patent Application No. 10819770.8 dated Oct. 28, 2014, 1 page.

Communication pursuant to Article 94(3) EPC for European Patent Application No. 10819770.8 dated Feb. 8, 2016, 7 pages.

Decision to Refuse European Patent Application No. 10819770.8 dated Apr. 18, 2017, 6 pages.

Chinese First Office Action and English Translation thereof dated Mar. 24, 2014 for Chinese Application Serial No. 201080051338.X, 31 pages.

Chinese Second Office Action and English Translation thereof dated Jan. 16, 2015 for Chinese Application Serial No. 201080051338.X, 26 pages.

Chinese Third Office Action and English Translation thereof dated Sep. 28, 2015 for Chinese Application Serial No. 201080051338.X, 12 pages.

Notification to Grant Patent Right for Invention and English Translation thereof dated Mar. 22, 2016 for Chinese Application Serial No. 201080051338.X, 4 pages.

International Search Report and Written Opinion for International Patent Application No. PCT/CA2011/050017 dated Apr. 13, 2011, 9 pages.

International Search Report and Written Opinion for International Patent Application No. PCT/CA2010/001658 dated Jan. 26, 2011, 9 pages.

International Search Report and Written Opinion for International Patent Application No. PCT/CA2011/050260 dated Jul. 26, 2011, 7 pages.

Non-Final Office Action for U.S. Appl. No. 13/521,216, dated Jun. 20, 2014.

Final Office Action for U.S. Appl. No. 13/521,216, dated May 21, 2015.

Non-Final Office Action for U.S. Appl. No. 13/521,216, dated Apr. 13, 2016.

Final Office Action for U.S. Appl. No. 13/521,216, dated Oct. 21, 2016.

Final Office Action for U.S. Appl. No. 13/503,352, dated Jan. 5, 2015.

(56) References Cited

OTHER PUBLICATIONS

Non-Final Office Action for U.S. Appl. No. 13/503,352, dated Aug. 21, 2014.
Non-Final Office Action for U.S. Appl. No. 15/224,063, dated Sep. 1, 2016.
Non-Final Office Action for U.S. Appl. No. 13/695,419, dated Oct. 31, 2014.
Final Office Action for U.S. Appl. No. 13/695,419, dated Jun. 2, 2015.
Non-Final Office Action for U.S. Appl. No. 13/695,419, dated Dec. 17, 2015.
Non-Final Office Action for U.S. Appl. No. 13/503,352, dated Aug. 18, 2015.
Non-Final Office Action for U.S. Appl. No. 13/695,419, dated Apr. 5, 2016.
Non-Final Office Action for U.S. Appl. No. 13/695,419, dated Oct. 12, 2016.
Non-Final Office Action for U.S. Appl. No. 13/824,324, dated Mar. 9, 2017.
International Search Report and Written Opinion for International Patent Application No. PCT/CA2011/050569 dated Dec. 5, 2011.
Non-Final Office Action for U.S. Appl. No. 14/664,285, dated Jun. 4, 2015.
Final Office Action for U.S. Appl. No. 14/664,285, dated Sep. 21, 2015.
Non-Final Office Action for U.S. Appl. No. 14/664,285, dated Mar. 4, 2016.
Final Office Action for U.S. Appl. No. 14/664,285, dated Jul. 29, 2016.
Non-Final Office Action for U.S. Appl. No. 15/070,643, dated Aug. 26, 2016.
Non-Final Office Action for U.S. Appl. No. 15/589,841, dated Jun. 5, 2017.
International Search Report and Written Opinion for International Patent Application No. PCT/CA2017/050257 dated May 19, 2017.
International Search Report and Written Opinion for International Patent Application No. PCT/CA2017/050197 dated May 30, 2017, 15 pages.
Non-Final Office Action for U.S. Appl. No. 15/466,590, dated Jul. 13, 2017, 20 pages.
Non-Final Office Action for U.S. Appl. No. 15/055,952, dated Aug. 12, 2016, 33 pages.
International Search Report and Written Opinion for International Patent Application No. PCT/CA2017/050255 dated Jun. 19, 2017, 9 pages.
Angwin et al., "Scrapers' Dig Deep for Data on Web," http://online.wsj.com/article/SB10001424052748703358504575544381288117888.html?mod=djemalertNEWS, Oct. 12, 2010, printed Nov. 6, 2010, 5 pages.
Anthes, "The Search Is on," Non-Obvious Relationship Awareness, http://www.computerworld.com/s/article/70041IThe_Search_Is_On, Apr. 15, 2002, printed Nov. 6, 2010, 8 pages.
Baras et al., "Dynamic Self-Organization and Clustering in Distributed Networked Systems for Performance Improvement," Proceedings of the 47th annual Allerton conference on Communication, Control, and Computing, Alierton'09, Illinois, USA, pp. 968-975, Sep. 30-Oct. 2, 2009.
Chakraborty et al., "TrustBAC-Integrating Trust Relationships into the RBAC Model for Access Control in Open Systems," Proceedings of the eleventh ACM symposium on AccessControl Models and Technologies, SACMAT '06, pp. 49-58, Jun. 7-9, 2006.
Ding et al., "Transitive Closure and Metric Inequality of Weighted Graphs: Detecting Protein Interaction Modules Using Cliques," Int. J. Data Mining and Bioinformatics, Vo. 1, o. Feb. 2006, pp. 162-177, Sep. 2006.
Facebook announces groups, downloading, http://content.usatoday.com/communities/technologylive/post/2010/1 0/live-facebook-announcesdownloading- other-features/1, Oct. 6, 2010, 7 pages.
Feldman et al., "Robust Incentive Techniques for Peer-to-Peer Networks," Proceedings of the fifth ACM Conference on Electronic Commerce EC'04, New York, New York, USA, pp. 102-111, May 17-20, 2004.
Final Office Action for U.S. Appl. No. 15/079,952, dated Dec. 16, 2016, 14 pages.
Gan et al., "A Novel Reputation Computing Model for Mobile Agent-Based E-Commerce Systems," Proceedings of the International Conference on Information Security and Assurance, ISA 2008, pp. 253-260, Apr. 24-26, 2008.
Geisberger, et al., "Contraction Hierarchies: Faster and Simpler Hierarchical Routing in Road Networks," LNCS 5038:319-333 (2008).
Golbeck et al., "Inferring Trust Relationships in Web-based Social Networks," Journal of ACM Transactions of Internet Technology (TOIT), vol. 6, issue 4, Nov. 2006.
Gu et al., "Processing Massive Sized Graphs Using Sector/Sphere," Proceedings of the 2010 IEEE Workshop on Many-Task Computing on Grids and Supercomputers (MTAGS), New Orleans,LA, USA, pp. 1-10, Nov. 15, 2010.
Gupta et al., "A Reputation System for Peer-to-Peer Networks," Proceedings of the 13th International Workshop on Network and operating systems support for digital audio and video NOSSDAV'03, Monterey, California, USA, Jun. 1-3, 2003.
Gupta et al., "Reputation Management Framework and its use as Currency in large-Scale Peer to-Peer Networks," "Proceedings of the Fourth IEEE International Conference on Peer-to-Peer Computing P2P2004, Zurich, Switzerland, pp. 124-132, Aug. 25-27, 2004 (Aug. 25, 2004)".
Hartley et al., "MSSG: A Framework for Massive-Scale Semantic Graphs," Proceedings of 2006 IEEE International Conference on Cluster Computing, CLUSTER'2006, Barcelona, Spain, pp. 1-10, Sep. 25-28, 2006.
Huynh et al., "An Integrated Trust and Reputation Model for Open Multi-Agent Systems," Journal of Autonomous Agents and Multi-Agent Systems, vol. 13, issue 2, Sep. 2006.
International Search Report and Written Opinion for International Patent Application No. PCTICA2016/050305 dated Jun. 3, 2016, 8 pages.
Josang et al., "Simplification and Analysis of Transitive Trust Networks," Journal of Web Intelligence and Agent Systems, vol. 4, issue 2, Apr. 2006.
Kamola et al., "Reconstruction of a Social Network Graph from Incomplete Call Detail Records," Conference Proceedings of the International Conference on Computational Aspects of SocialNetworks (CASoN), Oct. 19, 2011, pp. 136-140.
Kang et al., "PEGASUS: A Peta-Scale Graph Mining System Implementation and Observations," Proceedings of the Ninth IEEE International Conference on Data Mining, ICDM'09, Miami, FL,USA, pp. 229-238, Dec. 6-9, 2009.
Kim et al., "Design and Implementation of the location-based Personalized Social Media Service," Conference Proceedings of the International Conference on Internet and Web Applications and Services (ICIW), May 9, 2010, pp. 116-121.
Lumsdaine et al., "Challenges in Parallel Graph Processing," Parallel Processing letters, vol. 17, No. 1, pp. 5-20, Mar. 2007.
Malewicz et al., "Pregel: a System for large-Scale Graph Processing," Proceedings of the 2010 International Conference on Management Data, SIGMOD'10, Indianapolis, Indiana, USA, pp. 135-145, Jun. 6-11, 2010.
Meyer, "Outrage as Credit Agency Plans to Mine Facebook Data," Mashable.com, Jun. 7, 2012, 3 pages.
Mining Social Networks, "Untangling the social Web," http://www.economist.com/node/16910031?story_id=16910031&fsrc=rss, Sep. 2, 2010, printed Nov. 6, 2010, 5 pages.
Mori et al., "Improving Deployability of Peer-Assisted CDN Platform with Incentive," Proceedings of IEEE Global Telecommunications Conference GLOBECOM 2009, Honolulu, Hawaii, USA, pp. 1-7, Nov. 30-Dec. 4, 2009.
Mui et al., "A Computational Model of Trust and Reputation," Proceedings of the 35th Annual Hawaii International Conference on System Sciences, HICSS '02, vol. 7, pp. 2431-2439, Jan. 7-10, 2002.

(56) References Cited

OTHER PUBLICATIONS

Notice of Allowance for U.S. Appl. No. 15/224,172, dated Oct. 14, 2016.
Notice of Allowance for U.S. Appl. No. 15/056,484, dated Jul. 13, 2016.
Non-Final Office Action for U.S. Appl. No. 15/079,952, dated Jul. 14, 2016.
Notice of Allowance for U.S. Appl. No. 14/664,285, dated Oct. 7, 2016.
Notice of Allowance for U.S. Appl. No. 15/070,643, dated Apr. 7, 2017.
Notice of Allowance for U.S. Appl. No. 15/406,405, dated Apr. 6, 2017.
Safaei et al., "Social Graph Generation & Forecasting Using Social network Mining," Proceedings of the 33rd Annual IEEE International Computer Software and Applications Conference, COMPSAC '09, pp. 31-35, Jul. 20-24, 2009.
"Startup Wants to Base Your Credit Score on Social Media Profiles," Technology Review 7, Jun. 7, 2012, 18 pages.
Taiwanese Office Action for Taiwanese Patent Application No. 105108584 dated Oct. 31, 2016, 7 pages.
Wallentin et al., "A Cross-Layer Route Discovery Strategy for Virtual Currency Systems in Mobile Ad Hoc Networks," Proceedings of the Seventh International Conference on Wireless On-demand Network Systems and Services IEEE/IFIP WONS 2010, Kranjska Gora, Slovenia, pp. 91-98, Feb. 3-5, 2010.
Zetter, "Tracking Terrorists the Las Vegas Way," http://pcworld.about.com/news/Aug072002id1 03692.htm, printed Nov. 6, 2010, 3 pages.
Zhang et al., "A Review of Incentive Mechanisms in Peer-to-Peer Systems," Proceedings of the First International Conference on Advances in P2P Systems AP2PS'09, Sliema, Malta, pp. 45-50, Oct. 11-16, 2009.
Zhang et al., "MARCH: A Distributed Incentive Scheme for Peer-to-Peer Networks," "Proceedings of the 26th Annual IEEE Conference on Computer Communication INFOCOM 2007, Anchorage, Alaska, USA, pp. 1091-1099, May 6-12, 2007 (Jun. 5, 2007)".
Non-Final Office Action for U.S. Appl. No. 13/498,429, dated Apr. 17, 2014.
Non-Final Office Action for U.S. Appl. No. 13/498,429, dated Jul. 25, 2014.
Final Office Action for U.S. Appl. No. 13/498,429, dated Jan. 16, 2015.
Non-Final Office Action for U.S. Appl. No. 14/282,935, dated Jul. 21, 2014.
Final Office Action for U.S. Appl. No. 14/282,935, dated Jan. 30, 2015.
Non-Final Office Action for U.S. Appl. No. 14/282,935, dated Aug. 5, 2015.
Final Office Action for U.S. Appl. No. 14/282,935, dated Feb. 12, 2016.
Non-Final Office Action for U.S. Appl. No. 15/254,642, dated Dec. 28, 2016.
EPO. Mitteilung des Europischen Patentamts vom 1. Oct. 2007 ber Geschftsmethoden = Notice from the European Patent Office dated Oct. 1, 2007 concerning business methods = Communiqu de l'Office europen des brevets,en date du Oct. 1, 2007, concernant les mthodes dans le domaine des activites economiques. vol. 30,Nr:11,pp. 592-593. Journal Officiel De L'Office Europeen Des Brevets.Official Journal of the European Patent OFFICE.AMTSBLATTT Des Europaeischen Patenta, Nov. 1, 2007 OEB, Munchen, DE.
Tang, et al. Social Influence Analysis in Large-scale Networks, Proceedings of the ACM SIGKDD International Conference on Knowledge Discovery and Data Mining, 2009, ACM, 9 pages.
Non-Final Office Action for U.S. Appl. No. 15/070,643, dated Feb. 24, 2017, 23 pages.
Office Action for U.S. Appl. No. 13/695,419, dated Jun. 14, 2017, 44 pages.
Japanese Office Action for Japanese Patent Application No. 2016-131310 dated Aug. 2, 2017, 4 pages.

Office Action for U.S. Appl. No. 15/224,063, dated Jul. 14, 2017, 36 pages.
Office Action for U.S. Appl. No. 15/400,471, dated Aug. 7, 2017, 24 pages.
Office Action for U.S. Appl. No. 15/630,299, dated Aug. 10, 2017, 17 pages.
International Search Report and Written Opinion for International Patent Application No. PCT/CA2017/050351 dated Jun. 19, 2017, 10 pages.
Non-Final Office Action for U.S. Appl. No. 15/671,102 dated Sep. 22, 2017, 21 pages.
Non-Final Office Action for U.S. Appl. No. 15/675,041 dated Oct. 6, 2017, 72 pages.
Canadian Office Action for Canadian Application Serial No. 2,775,899 dated Oct. 12, 2017, 6 pages.
Final Office Action dated Dec. 15, 2017 for U.S. Appl. No. 15/224,063, 52 pages.
Non-Final Office Action dated Dec. 15, 2017 for U.S. Appl. No. 15/589,841, 66 pages.
Final Office Action dated Jan. 19, 2018 for U.S. Appl. No. 15/466,590, 56 pages.
Final Office Action dated Feb. 8, 2018, for U.S. Appl. No. 15/630,299, 40 pages.
International Search Report and Written Opinion for International Patent Application No. PCT/CA2017/050962 dated Nov. 20, 2017, 9 pages.
Office Action dated Apr. 5, 2018, for U.S. Appl. No. 15/644,356, 74 pages.
Notice of Allowance dated Mar. 20, 2018, for U.S. Appl. No. 15/589,841, 44 pages.
Non-Final Office Action received for U.S. Appl. No. 15/046,041, dated Apr. 26, 2018, 70 pages.
Non-Final Office Action received for U.S. Appl. No. 15/907,164, dated May 24, 2018, 29 pages.
Final Office Action received for U.S. Appl. No. 15/675,041, dated May 17, 2018, 73 pages.
Non-Final Office Action received for U.S. Appl. No. 15/630,299, dated May 17, 2018,19 pages.
Notice of Allowance for U.S. Appl. No. 15/953,011 dated Aug. 28, 2018, 72 pages.
First Action Interview Pilot Program Pre-Interview Communication for U.S. Appl. No. 15/953,011 dated Jul. 10, 2018, 10 pages.
First Action Interview Pilot Program Pre-Interview Communication for U.S. Appl. No. 15/907,166 dated Jul. 6, 2018, 6 pages.
www.trustscience.com Inc., et al., "Defendants' Motion for Stay of Discovery Pending Decision on Motion to Dismiss," Case 6:18-cv-01174-CEM-DCI, Document 32, Filed Sep. 21, 2018, 12 pages.
www.trustscience.com Inc., et al., "Plaintiff's Response in Opposition to Defendants' Motion to Stay Discovery Pending Decision on Motion to Dismiss," Case 6:18-cv-01174-CEM-DCI, Document 35, Filed Oct. 5, 2018, 20 pages.
www.trustscience.com Inc., et al., "Motion to Dismiss the Complaint and Memorandum of Law in Support," Case 6:18-cv-01174-CEM-DCI, Document 41, Filed Oct. 19, 2018, 36 pages.
www.trustscience.com Inc., et al., "Plaintiff's Response to Defendants' Motion to Dismiss and Notice of Intent to File Amended Complaint," Case 6:18-cv-01174-CEM-DCI, Document 44, Filed Nov. 2, 2018, 3 pages.
www.trustscience.com Inc., et al., "First Amended Complaint and Demand for Injunctive Relief and Jury Trial," Case 6:18-cv-01174-CEM-DCI, Document 46 Filed Nov. 6, 2018, 49 pages.
www.trustscience.com Inc., et al., "Order and Permanent Injunction," Case 6:18-cv-01174-CEM-DCI, Document 49 Filed Nov. 21, 2018, 4 pages.
Examiner's Report for Canadian Application Serial No. 2,775,899 dated Oct. 2, 2018, 8 pages.
Final Office Action for U.S. Appl. No. 15/400,471 dated Oct. 29, 2018, 42 pages.
Final Office Action for U.S. Appl. No. 15/644,356 dated Oct. 18, 2018, 41 pages.
Non-Final Office Action for U.S. Appl. No. 16/014,032 dated Oct. 4, 2018, 74 pages.

(56) References Cited

OTHER PUBLICATIONS

First Action Interview Pilot Program Communication for U.S. Appl. No. 15/907,166 dated Oct. 31, 2018, 46 pages.
Final Office Action for U.S. Appl. No. 15/907,164 dated Nov. 14, 2018, 70 pages.
Chinese First Office Action and English Translation thereof dated Sep. 4, 2018 for Chinese Application Serial No. 201610392926.9, 17 pages.
Final Office Action for U.S. Appl. No. 15/046,041 dated Nov. 20, 2018, 32 pages.
Non-Final Office Action for U.S. Appl. No. 16/141,615 dated Nov. 29, 2018, 15 pages.
Non-Final Office Action received for U.S. Appl. No. 15/675,041 dated Jan. 11, 2019, 91 pages.
Non-Final Office Action received for U.S. Appl. No. 16/204,651 dated Jan. 29, 2019, 47 pages.
Notice of Allowance received for U.S. Appl. No. 16/195,946 dated Feb. 14, 2019, 69 pages.
Non-Final Office Action received for U.S. Appl. No. 15/644,356 dated Mar. 21, 2019, 39 pages.
First Office Action received for Chinese Patent Application Serial No. 201610392929.2 dated Mar. 14, 2019, 20 pages (Including English Translation).
Final Office Action received for U.S. Appl. No. 15/907,166 dated Apr. 24, 2019, 27 pages.
Final Office Action received for U.S. Appl. No. 16/014,032 dated Apr. 17, 2019, 38 pages.
Non-Final Office Action received for U.S. Appl. No. 15/046,041 dated May 22, 2019. 37 pages.

\* cited by examiner

800

| Metric | Component Score (out of 1000) | Component Score (%) |
|---|---|---|
| 100 or less friends | 200 | 20% |
| 100 – 250 friends | 400 | 40% |
| 250-400 friends | 600 | 60% |
| 400-500 friends | 800 | 80% |
| 500+ friends | 1000 | 100% |

802 — Metric
804 — Component Score (out of 1000)
806 — Component Score (%)

FIG. 8

CALCULATING A TRUST SCORE

CROSS-REFERENCE TO RELATED APPLICATIONS

This application is a continuation of U.S. patent application Ser. No. 14/664,285, filed Mar. 20, 2015, which is hereby incorporated by reference herein in its entirety.

BACKGROUND

Trust is an essential component to many social and business interactions, but trust can be both hard to measure and difficult to quantify. People typically look towards a variety of different factors, experiences, and influences to determine how much to trust another party or entity in a transaction. For example, a potential customer deciding whether to dine at a particular restaurant may take into account how many times he or she has eaten at the restaurant, word of mouth from friends and family, and any ratings from online feedback sites. As another example, a bank may look up the credit score of a potential borrower as a measure of their financial responsibility when determining whether to issue a loan. Often, people can have wildly different preferences as to which factors are the most important in determining trust levels, and these preferences may change depending on the type and details of the transaction. Trust can also change over time, reflecting the cumulative experiences, transaction history, and recent trends between entities. A single negative event can destroy trust, and trust can also be rebuilt over time. All of the above considerations make "trust" an elusive measure to capture.

SUMMARY

Systems, devices, and methods are described herein for calculating a trust score. The trust score may be calculated between entities including, but not limited to, human users, groups of users, organizations, businesses/corporations, products/product lines, and/or locations. The trust score may reflect the trustworthiness, reputation, membership, status, and/or influence of the entity in a particular community or in relation to another entity. The trust score may take into account data from any suitable data sources, including, but not limited to, network connectivity information, social network information, credit score, available court data, transaction history, ratings/feedback data, group/demographics data, search engine data, or any publically available information. The trust score may also include certain non-publically available information provided by the entities themselves (e.g., non-public transaction history, targeted ratings, etc.).

As used herein, a "system trust score" refers to a trust score calculated for an entity based on information available for the entity, without specific reference to another entity or activity/transaction. The system trust score may represent a base level of trustworthiness for the entity that does not take into account information about a specific activity/transaction. In some embodiments, the system trust score may be calculated based on publicly available information, such as verification data, a network connectivity score, and/or ratings data. As defined herein, a "network community" may include any collection or group of entities connected through a network, including, but not limited to a computer network or a social network. In some embodiments, a user may set an initial trust score as a minimum trust level. In these embodiments, the initial trust score may be retrieved and updated based on publicly available information in order to determine the system trust score. In some embodiments, the system trust score may be provided to an end user upon request without the end user having to identify themselves. For example, an end user may query the system trust scores of other entities, for example through a website or a mobile application, without having to sign into the website or mobile application or otherwise having to identify themselves.

As used herein, a "peer trust score" refers to a trust score calculated for a first entity in relation to a second entity. The peer trust score may take into account certain information that is specific to the first and second entity, such as specific transaction history between the first and second entity, number of common contacts/friends, etc. In some embodiments, the peer trust score may be derived from the system trust score and represent an update of the system trust score. For example, in some embodiments, the peer trust score may be calculated based on substantially the same data sources as the system trust score, where some components may be updated in order to further weight or take into account additional information that is specific to the first and second entity. In other embodiments, the peer trust score may be calculated independently from the system trust score and may be based on a different set of data sources than the system trust score.

As used herein, a "contextual trust score" refers to a trust score calculated for a first entity in relation to a specific activity or transaction. The contextual trust score may take into account certain information that is particular to the specific activity or transaction. In some embodiments, the contextual trust score may be derived from the system trust score or the peer trust score and represent an update of the system trust score or the peer trust score. For example, in some embodiments, the contextual trust score may be calculated based on substantially the same data sources as the system trust score, where some components may be updated in order to take into account information that is particular to the activity/transaction. In other embodiments, the contextual trust score may be calculated based on a different set of data sources than the system trust score and the peer trust score. In some embodiments, the contextual trust score may be calculated by weighting data from different data sources based on the type of activity/transaction. For example, the trust score of a potential borrower who is seeking a mortgage from a bank may heavily weight the borrower's credit score and financial history rather than their level of connectivity in a social network. In this manner, the contextual trust score may be based on the same or similar data sources as the system trust score and/or the peer trust score, but with a different weighting to combine the data from the data sources. In some embodiments, specific details of the transactions may also affect the calculation of the contextual trust score. For instance, the contextual trust score for a friend borrowing $10 may focus more on social network connectivity (e.g., the number of friends they have in common, etc.), while the contextual trust score for a borrower seeking a $100K loan from the bank may focus more on financial factors. In some embodiments, the details of the transaction may affect the weighting of the combination of data from the data sources.

According to one aspect, a method for updating a trust score may comprise identifying paths from a first entity to a second entity, calculating a network connectivity score based on the identified paths, receiving data about the second entity from a remote source, and calculating a ratings score based on the received data from the remote source. A trust score for the second entity may be determined by combining the network connectivity score and the ratings score. An indication of an activity to be performed by the first entity and the second entity may be received, and the trust score may be updated based on the indication of the activity. In some embodiments, the first and second entity may be connected by a social network. In such embodiments, identifying paths from the first entity to the second entity may comprise identifying an intermediate entity in the social network that connects the first entity to the second entity. For example, the intermediate entity may be a common friend between a first user and a second user. Calculating the network connectivity score may comprise determining a number of mutual friends between the first entity and the second entity. For example, the network connectivity score may be assigned according to a graduated scale based on the number of mutual friends between the first entity and the second entity. The network connectivity score may also be calculated based on the number of identified paths between the first and the second entity and whether the number of identified paths exceeds a certain threshold.

In some embodiments, the ratings data may be one of a credit score, criminal history data, financial transaction history data, and/or business reviews data. The ratings data may be combined with the network connectivity score according to a weighted sum in order to determine the trust score for the second entity. The weighted sum may be based on a default set of weights or based on user-assigned weights. The trust score for the second entity may then be updated based on the indication of the activity. For example, the indication of the activity may adjust the weighted sum such that a different weighted sum is used to calculate the trust score for the second entity.

In some embodiments, at least one of the first entity and the second entity is a human user. For instance, the trust score may be calculated between two users who are participating in a certain activity. In another embodiment, at least one of the first entity and the second entity may be a business. For example, the trust score between a user and a restaurant may be calculated in order to aid the user in determining whether to eat at the restaurant. In yet other embodiments, at least one of the first entity and the second entity may be a group of users or an organization. As an illustrative example, the second entity may be the Boy Scouts of America, and the trust score may be calculated between a first user and the Boy Scouts of America. In some embodiments, at least one of the first and second entity may be a product or an object. For instance, the first entity may be a first user, and the second entity may be a chainsaw, and a trust score may be calculated between the chainsaw and the first user. In this example, the trust score may take into account any user reviews of the chainsaw received from a third-party ratings source. In some embodiments, at least one of the first and second entity may be a location, city, region, nation, or any other geographic place. For instance, a trust score between a first user and a city, such as New York City, may be calculated. In this example, the trust score may take into account number of contacts that the first user has in New York City, traveler reviews received from third-party ratings sources, and/or and activities, transactions, or interactions that the first user has had with New York City.

In some embodiments, a decision related to the activity may be automatically resolved based, at least in part, on a calculated trust score. For instance, a bank may request the trust score of a potential borrower in order to evaluate the suitability of the borrower for a loan. Based on the updated trust score, the bank may automatically issue the loan, for example, if the trust score exceeds a certain threshold. In this manner, the system trust score, peer trust score, and/or the contextual trust score can, either alone or in combination, form the basis for automatic decision making.

In some embodiments, at least one of the system, peer, and/or contextual trust score may include a confidence range. For example, each of the components from the data sources may comprise a confidence range (such as a variance or a standard deviation) indicating a level of uncertainty in the data, and the component scores may be combined to form one of the system, peer, and/or contextual trust score. Thus, the resulting trust score may be represented by a mean score and a confidence range, and in some embodiments, the confidence range may be represented by a mean and standard deviation.

BRIEF DESCRIPTION OF THE DRAWINGS

The foregoing and other features and advantages will be apparent upon consideration of the following detailed description, taken in conjunction with the accompanying drawings, and in which:

FIG. 8 is a table showing an illustrative graded scale for assigning component scores based on a metric;

DETAILED DESCRIPTION

To provide an overall understanding of the systems, devices, and methods described herein, certain illustrative embodiments will be described. It will be understood that the systems, devices, and methods described herein may be adapted and modified for any suitable application and that such other additions or modifications will not depart from the scope hereof.

Figure 1:
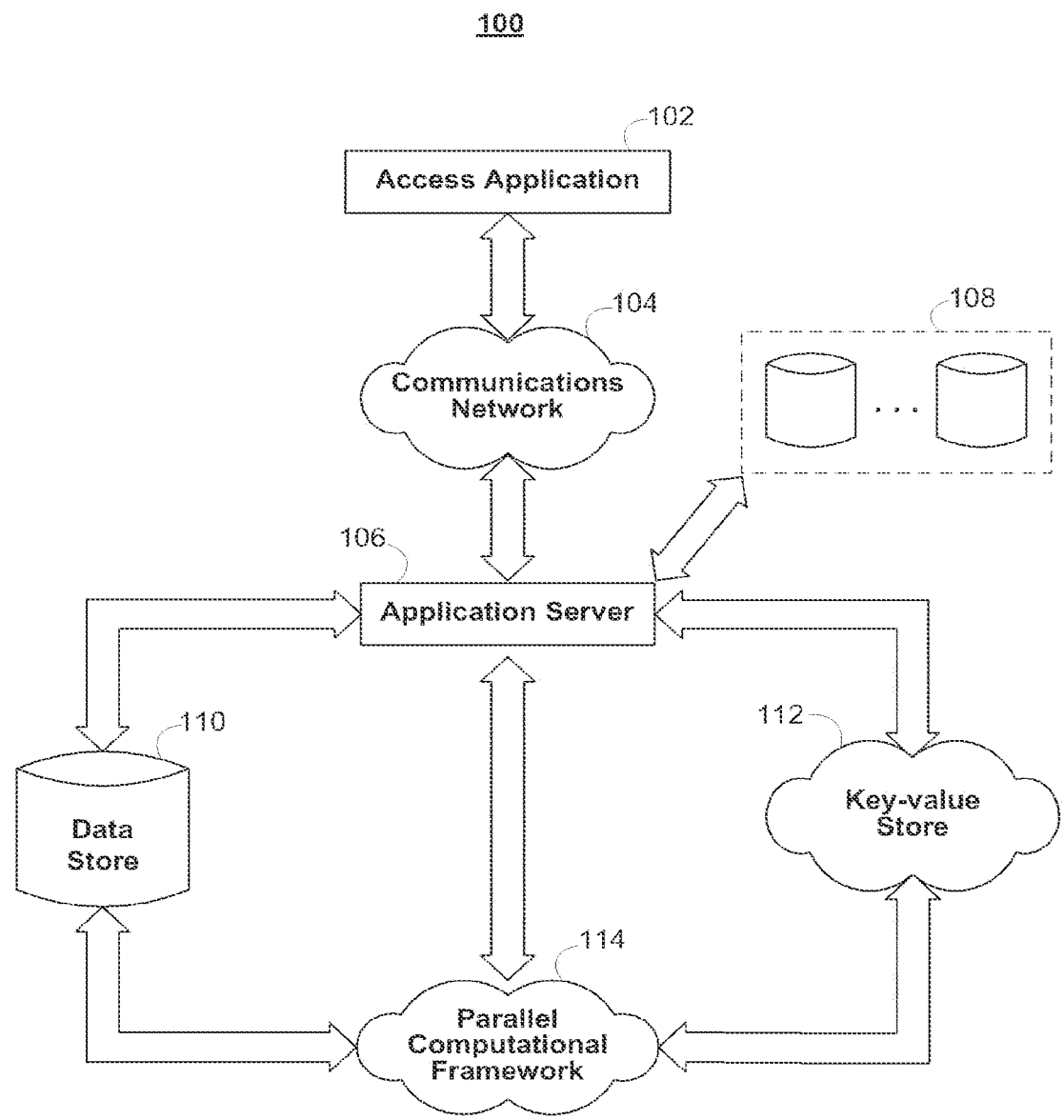
FIG. 1 is a block diagram of an illustrative architecture for calculating a trust score.

FIG. 1 shows a block diagram of an architecture 100 for calculating a trust score in accordance with certain embodiments of the present disclosure. A user may utilize access application 102 to access application server 106 over communications network 104. For example, access application 102 may include a computer application such as a standard web browser or an app running on a mobile device. Application server 106 may comprise any suitable computer server, including a web server, and communication network 106 may comprise any suitable network, such as the Internet. Access application 102 may also include proprietary applications specifically developed for one or more platforms or devices. For example, access application 102 may include one or more instances of an Apple iOS, Android, or WebOS application or any suitable application for use in accessing application server 106 over communications network 104. Multiple users may access application server 106 via one or more instances of access application 102. For example, a plurality of mobile devices may each have an instance of access application 102 running locally on the respective devices. One or more users may use an instance of access application 102 to interact with application server 106.

Communication network 104 may include any wired or wireless network, such as the Internet, WiMax, wide area cellular, or local area wireless network. Communication network 104 may also include personal area networks, such as Bluetooth and infrared networks. Communications on communications network 104 may be encrypted or otherwise secured using any suitable security or encryption protocol.

Application server 106, which may include any network server or virtual server, such as a file or web server, may access data sources 108 locally or over any suitable network connection. Application server 106 may also include processing circuitry (e.g., one or more computer processors or microprocessors), memory (e.g., RAM, ROM, and/or hybrid types of memory), and one or more storage devices (e.g., hard drives, optical drives, flash drives, tape drives). The processing circuitry included in application server 106 may execute a server process for calculating trust scores, while access application 102 executes a corresponding client process. The access application 102 may be executed by processing circuitry on a user's equipment, such as a computer or a mobile device (e.g., a cell phone, a wearable mobile device such as a smartwatch, etc.). The processing circuitry included in application server 106 and/or the processing circuitry that executes access application 102 may also perform any of the calculations and computations described herein in connection with calculating a trust score. In some embodiments, a computer-readable medium with computer program logic recorded thereon is included within application server 106. The computer program logic may calculate trust scores and may generate such trust scores for display on a display device. In some embodiments, application 102 and/or application server 106 may store a calculation date of a trust score and may generate for display the trust score together with a date of calculation.

Application server 106 may access data sources 108 over the Internet, a secured private LAN, or any other communications network. Data sources 108 may include one or more third-party data sources, such as data from third-party social networking services and third-party ratings bureaus. For example, data sources 108 may include user and relationship data (e.g., "friend" or "follower" data) from one or more of Facebook, MySpace, openSocial, Friendster, Bebo, hi5, Orkut, PerfSpot, Yahoo! 360, LinkedIn, Twitter, Google Buzz, Really Simple Syndication readers or any other social networking website or information service. Data sources 108 may also include data stores and databases local to application server 106 containing relationship information about users accessing application server 106 via access application 102 (e.g., databases of addresses, legal records, transportation passenger lists, gambling patterns, political and/or charity donations, political affiliations, vehicle license plate or identification numbers, universal product codes, news articles, business listings, and hospital or university affiliations).

Application server 106 may be in communication with one or more of data store 110, key-value store 112, and parallel computational framework 114. Data store 110, which may include any relational database management system (RDBMS), file server, or storage system, may store information relating to one or more network communities. For example, one or more of data tables 1100 (FIG. 11) may be stored on data store 110. Data store 110 may store identity information about users and entities in the network community, an identification of the nodes in the network community, user link and path weights, user configuration settings, system configuration settings, and/or any other suitable information. There may be one instance of data store 110 per network community, or data store 110 may store information relating to a plural number of network communities. For example, data store 110 may include one database per network community, or one database may store information about all available network communities (e.g., information about one network community per database table).

Parallel computational framework 114, which may include any parallel or distributed computational framework or cluster, may be configured to divide computational jobs into smaller jobs to be performed simultaneously, in a distributed fashion, or both. For example, parallel computational framework 114 may support data-intensive distributed applications by implementing a map/reduce computational paradigm where the applications may be divided into a plurality of small fragments of work, each of which may be executed or re-executed on any core processor in a cluster of cores. A suitable example of parallel computational framework 114 includes an Apache Hadoop cluster.

Parallel computational framework 114 may interface with key-value store 112, which also may take the form of a cluster of cores. Key-value store 112 may hold sets of key-value pairs for use with the map/reduce computational paradigm implemented by parallel computational framework 114. For example, parallel computational framework 114 may express a large distributed computation as a sequence of distributed operations on data sets of key-value pairs. User-defined map/reduce jobs may be executed across a plurality of nodes in the cluster. The processing and computations described herein may be performed, at least in part, by any type of processor or combination of processors. For example, various types of quantum processors (e.g., solid-state quantum processors and light-based quantum processors), artificial neural networks, and the like may be used to perform massively parallel computing and processing.

In some embodiments, parallel computational framework 114 may support two distinct phases, a "map" phase and a "reduce" phase. The input to the computation may include a data set of key-value pairs stored at key-value store 112. In the map phase, parallel computational framework 114 may split, or divide, the input data set into a large number of fragments and assign each fragment to a map task. Parallel computational framework 114 may also distribute the map tasks across the cluster of nodes on which it operates. Each map task may consume key-value pairs from its assigned fragment and produce a set of intermediate key-value pairs.

For each input key-value pair, the map task may invoke a user-defined map function that transmutes the input into a different key-value pair. Following the map phase, parallel computational framework 114 may sort the intermediate data set by key and produce a collection of tuples so that all the values associated with a particular key appear together. Parallel computational framework 114 may also partition the collection of tuples into a number of fragments equal to the number of reduce tasks.

In the reduce phase, each reduce task may consume the fragment of tuples assigned to it. For each such tuple, the reduce task may invoke a user-defined reduce function that transmutes the tuple into an output key-value pair. Parallel computational framework 114 may then distribute the many reduce tasks across the cluster of nodes and provide the appropriate fragment of intermediate data to each reduce task.

Tasks in each phase may be executed in a fault-tolerant manner, so that if one or more nodes fail during a computation the tasks assigned to such failed nodes may be redistributed across the remaining nodes. This behavior may allow for load balancing and for failed tasks to be re-executed with low runtime overhead.

Key-value store 112 may implement any distributed file system capable of storing large files reliably. For example, key-value store 112 may implement Hadoop's own distributed file system (DFS) or a more scalable column-oriented distributed database, such as HBase. Such file systems or databases may include BigTable-like capabilities, such as support for an arbitrary number of table columns.

Figure 2:
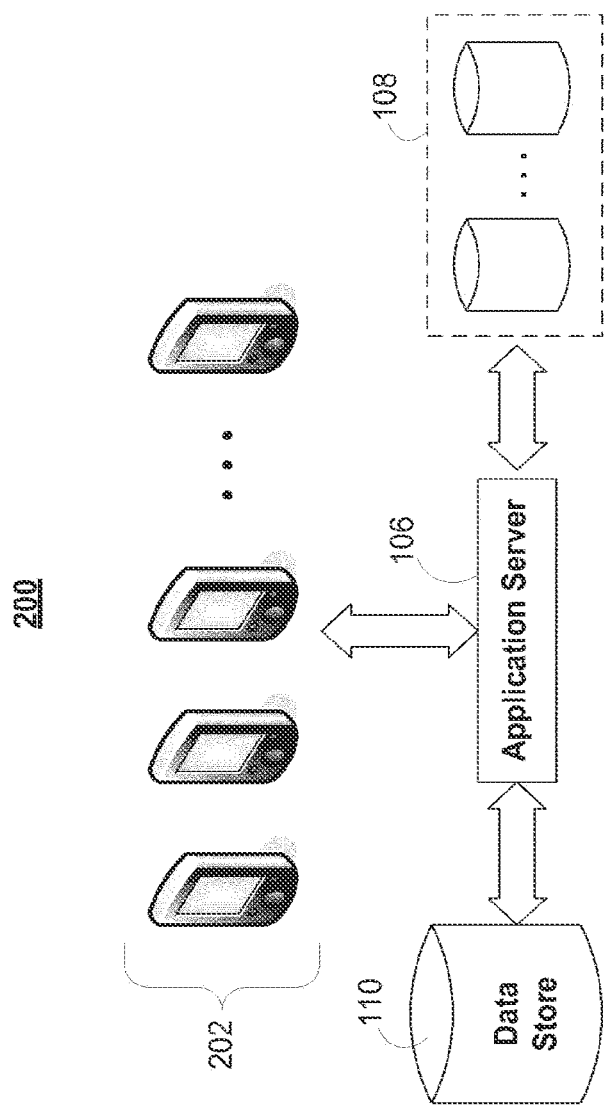
FIG. 2 is another block diagram of an illustrative architecture for calculating a trust score.

Although FIG. 1, in order to not over-complicate the drawing, only shows a single instance of access application 102, communications network 104, application server 106, data source 108, data store 110, key-value store 112, and parallel computational framework 114, in practice architecture 100 may include multiple instances of one or more of the foregoing components. In addition, key-value store 112 and parallel computational framework 114 may also be removed, in some embodiments. As shown in architecture 200 of FIG. 2, the parallel or distributed computations carried out by key-value store 112 and/or parallel computational framework 114 may be additionally or alternatively performed by a cluster of mobile devices 202 instead of stationary cores. In some embodiments, cluster of mobile devices 202, key-value store 112, and parallel computational framework 114 are all present in the network architecture. Certain application processes and computations may be performed by cluster of mobile devices 202 and certain other application processes and computations may be performed by key-value store 112 and parallel computational framework 114. In addition, in some embodiments, communication network 104 itself may perform some or all of the application processes and computations. For example, specially configured routers or satellites may include processing circuitry adapted to carry out some or all of the application processes and computations described herein.

Cluster of mobile devices 202 may include one or more mobile devices, such as PDAs, cellular telephones, mobile computers, or any other mobile computing device. Cluster of mobile devices 202 may also include any appliance (e.g., audio/video systems, microwaves, refrigerators, food processors) containing a microprocessor (e.g., with spare processing time), storage, or both. Application server 106 may instruct devices within cluster of mobile devices 202 to perform computation, storage, or both in a similar fashion as would have been distributed to multiple fixed cores by parallel computational framework 114 and the map/reduce computational paradigm. Each device in cluster of mobile devices 202 may perform a discrete computational job, storage job, or both. Application server 106 may combine the results of each distributed job and return a final result of the computation.

Figure 3:
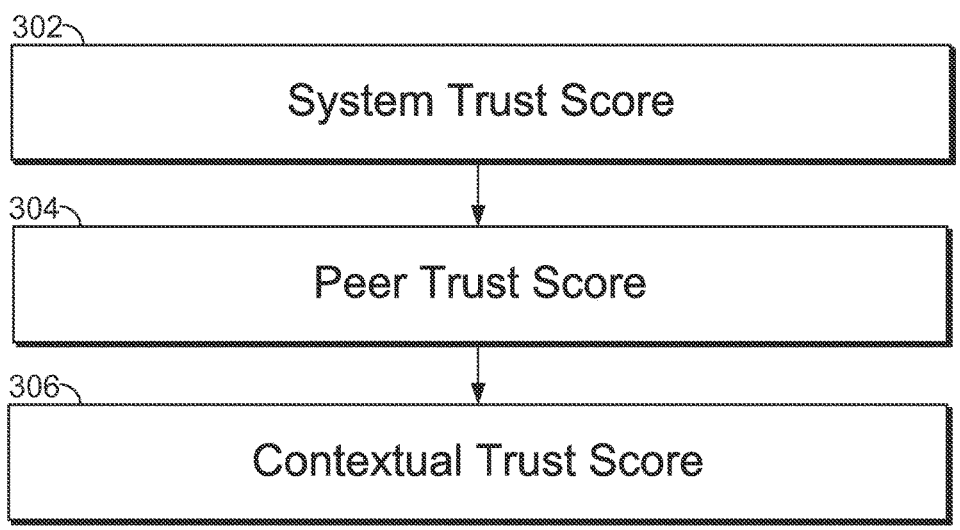
FIG. 3 is a diagram of an illustrative tiered trust score system.

FIG. 3 is a diagram 300 of a tiered trust score system in accordance with certain embodiments of the present disclosure. The system trust score 302, peer trust score 304, and contextual trust score 306 may represent a tiered trust system in which a user may inquire about the trustworthiness of a target entity either in isolation, in relation to another entity, and/or in relation to a specific activity/transaction. In some embodiments, the system trust score 302 may be calculated from a first set of data sources, (e.g., data sources 108 in FIG. 1). In some embodiments, the peer trust score 304 may be calculated as an update to system trust score 302 based on a second set of data sources, which may or may not be the same as the first set of data sources. Peer trust score 304 may or may not take into account additional data sources (e.g., data sources 108 in FIG. 1). In some embodiments, peer trust score 304 may also combine the data from the data sources according to a different weighting than the system trust score 302. In some embodiments, the contextual trust score 306 may be calculated as an update to either peer trust score 304 or system trust score 302. For example, the contextual trust score 306 may take into account different data sources (e.g., data sources 108 in FIG. 1) or may be based on the same data sources as system trust score 302 and/or peer trust score 304. In some embodiments, the contextual trust score 306 may combine data from the data sources according to a different weighting as system trust score 304 and/or peer trust score 304. Although the system trust score 302, peer trust score 304, and contextual trust score 306 are shown in FIG. 3 as a hierarchical system, each trust score may be calculated and presented either separately or together with the other trust scores.

The system trust score 302, peer trust score 304, and contextual trust score 306 may be represented in any suitable fashion. As an illustrative example, the system trust score 302, peer trust score 304, and contextual trust score 306 may each be represented as a percentage out of 100 or as a numerical score out of 1000. In other embodiments, the system trust score 302, peer trust score 304, and contextual trust score 306 may be represented by different categories of trustworthiness (e.g., "reliable," "flaky," "honest," "fraudulent," etc.) or by a graphical scheme (e.g., a color spectrum representing level of trustworthiness). For ease of illustration, the trust score and component scores that comprise the trust scores will be discussed herein as numerical values. However, other methods of portraying a calculated trust score will be contemplated by those of ordinary skill in the art and will not depart from the scope hereof.

Each type of trust score may combine data from data sources according to a specific weighting. For instance, a weighting for a system trust score may be set as:
 Data Verification—5%
 Network Connectivity—20%
 Credit Score—15%
 Court Data—10%
 Ratings/Feedback Data—20%
 Group/Demographics—5%
 Search Engine Mining—5%
 Transaction History—20%

In some embodiments, a user may adjust these default weightings according to their preferences. For example, a user who values network analytics (e.g., how many friends we have in common) may assign a heavier weight, e.g., 25% to network connectivity, while lowering the weight of credit score to 10%. Conversely, a bank who cares very much about the credit score of its customers may assign a heavier weight to credit score and discount network connectivity.

The following is an example that illustrates one application of a system trust score 302, peer trust score 304, and contextual trust score 306. It will be understood that the following is provided for illustrative purposes only and that the systems, devices, and methods described herein may be further adapted or modified.

John sees an ad at ABC Restaurant for a short order cook and is trying to decide if he should apply. John opens an app on his mobile device and searches for ABC Restaurant. The app shows there are multiple matches to this search, but the nearest one is sorted to the top. After tapping on the correct restaurant, the app shows the ABC Restaurant profile page. The ABC Restaurant profile page includes a system trust score for ABC Restaurant, which is calculated based in part on the ratings from three blogs. John taps to see more details and sees a list of most recent blogs from bloggers. By tapping on individual blogs, he can read the actual article. He can also tap on the bloggers to see their profile page in the app.

The system trust score for ABC Restaurant is also calculated based on previous transactions where ABC Restaurant was the employer. John taps to show a list of previous transactions, ratings of those transactions, and comments.

John taps on the social graph to see how he is connected to the restaurant through one or more networks (e.g., Facebook, MySpace, Twitter, LinkedIn, etc.). From the social graph he sees that Bob, the manager, is a friend of a friend. Based on the social graph data, the app updates the system trust score to calculate a peer trust score between John and ABC Restaurant. The peer trust score is higher than the system trust score to indicate the incremental increase in trustworthiness based on the connections between John and Bob the manager. The app also displays Bob's system trust score, calculated based on publicly available information and a default weighting, and Bob's peer trust score with respect to John, which also takes into account the social graph data.

John decides to apply for the job. After an interview, Bob the manager is deciding whether or not to hire John as a short order cook. Bob uses the app to search for John. There are multiple results for John, but Bob eventually finds him and taps on his entry. John's profile page displays his system trust score, calculated based on publicly available information (e.g., credit score, verification data, search engine mining, employment history, etc.) and a default weighting. Bob taps on the social graph to see how he is connected to John. He discovers that they are connected through a friend of a friend. The app updates John's system trust score based on the social network data to calculate a peer trust score between John and Bob, which is higher than John's system trust score to indicate the incremental increase in trustworthiness due to the connections between John and Bob. The app also shows average ratings from previous transactions where John was the employee. Bob taps to show a list of transactions, which can be ordered into chronological order and filtered by type of job. Bob also indicates to the app that he wishes to hire John as an employee. The app adjusts the weightings of the trust score to give a higher weight to the employee history rather than other components (such as credit score). The app uses the adjusted weightings to update the peer trust score to calculate the contextual trust score, which represents John's trustworthiness as a potential employee.

After reviewing the information in the app, Bob has decided to hire John. From John's profile page, he taps on the Action icon and chooses "Hire". The app prompts Bob to fill in relevant information such as position, start date, annual salary, and vacation days per year. After confirming the data, the transaction appears in Bob's Notification list, with the status of "Waiting for John . . . " John receives a notification on his phone. He opens the app and sees a new transaction in his Notifications list. The app prompts John to confirm the details of his new job. John chooses to confirm, and Bob receives a notification that John has confirmed the transaction.

As illustrated in the above example, a user may request a system trust score for another entity, which may then be subsequently refined into a peer trust score based on information specific to the parties involved and into a contextual trust score based on the details of an activity/transaction to be performed by the parties.

Figure 4:
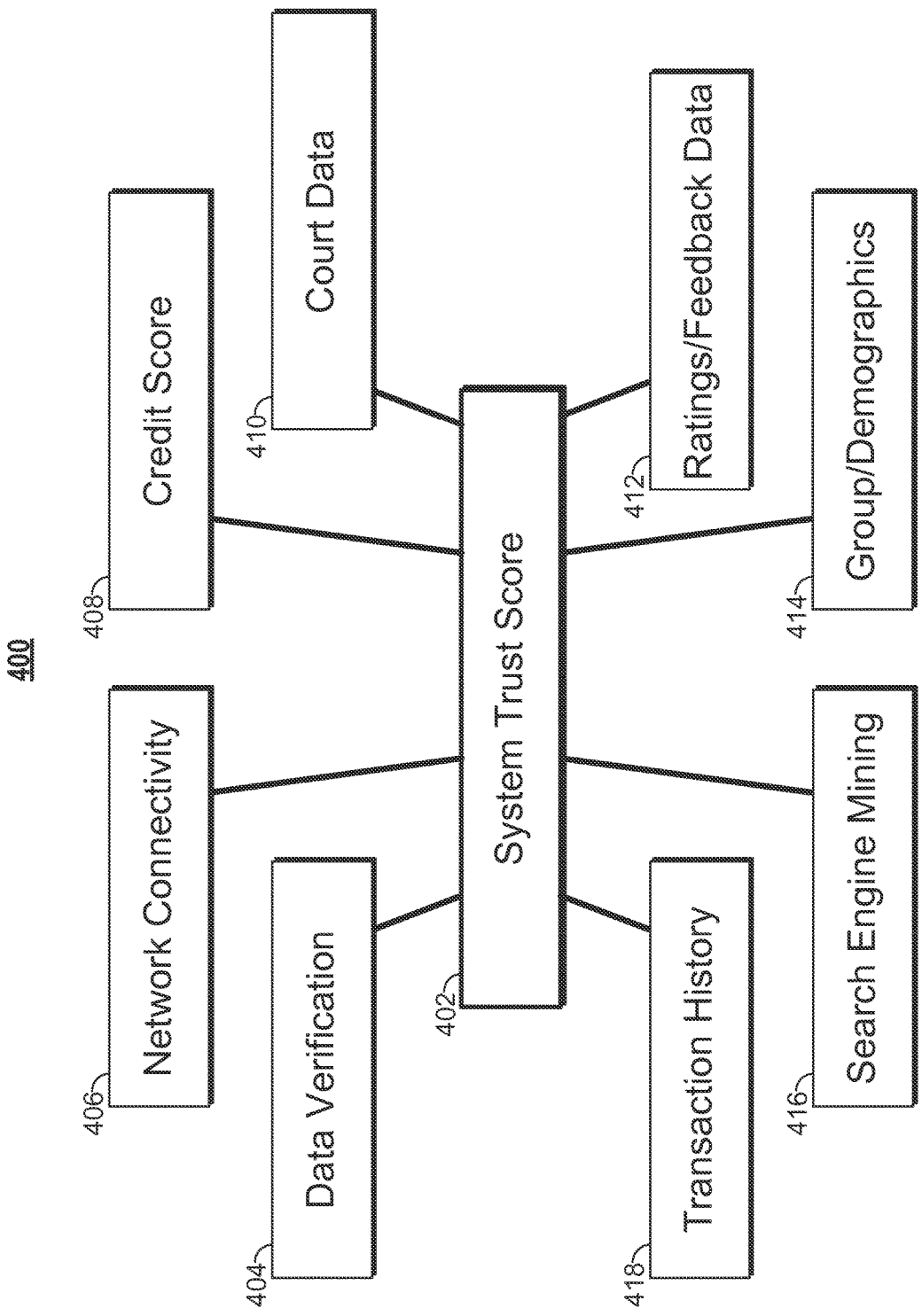
FIG. 4 is a block diagram of illustrative components that comprise a system trust score.

FIG. 4 is a block diagram 400 of components 404-418 that comprise a system trust score 402 in accordance with certain embodiments of the present disclosure. The system trust score 402 may comprise a data verification component 404, a network connectivity component 406, a credit score component 408, a court data component 410, a ratings/feedback data component 412, a group/demographics component 414, a search engine mining component 416, and/or a transaction history component 418. The components 404-418 may be received either locally or through a suitable network connection from one or more data sources (e.g., data sources 108 in FIG. 1). It will be understood that components 404-418 are provided for illustrative purposes only and that the trust scores described herein may comprise more or fewer components than components 404-418 provided in FIG. 4.

Data verification component 404 may include data that verifies information associated with the target entity. In some embodiments, the data verification component 404 may include verification of contact information, including, but not limited to, email address, phone number, and/or mailing address. The data verification component may also comprise email, IM, and other messaging factors, such as frequency of messages, time of day of messages, depth of thread, or a review of threads for key transaction/activity types (e.g., loan, rent, buy, etc.). Data verification component 404 may take into account data from passport and/or other government IDs, tax return factors (e.g., a summary of a tax return to prove income), educational data (e.g., certificates of degree/diploma), group affiliation factors (e.g., invoices that prove membership to a group), achievements (e.g., proof of awards, medals, honorary citations, etc.), employment data (e.g., paystub data). The data verification component 404 may also incorporate facial recognition software to verify certain documents, such as IDs. In some embodiments, this facial recognition software may be used for subsequent verification of the user's identity. As an illustrative example, the data verification component 404 may be used as a part of an airport scanning system to verify the user's identity. The data verification component 404 may comprise subcomponents such as data corresponding to the above illustrative examples, and as more subcomponents are verified, the higher the data verification component 404. The subcomponents may be combined to determine the data verification component 404 in any suitable manner, such as a weighted sum or the method discussed further below in relation to FIGS. 8 and 9. In some embodiments, verification of the data may be achieved by a document that proves the subject of the subcomponent (e.g., a tax return to prove income) or by peer verification. For instance, employment information may be vetted by peers connected to the target user, and as more peers positively vet the employment information, the higher the subcomponent score becomes. In some embodiments, the information may be deleted once verified. For example, images of passports/IDs may be deleted once the information contained therein is validated.

Network connectivity component 406 is discussed further below in relation to FIGS. 11-13. In some embodiments, the network connectivity component 406 may comprise data from a social network (e.g., Facebook, Twitter, Instagram, Pinterest, LinkedIn, etc.). For example, the network connectivity component 406 may take into account the number of connections, such Facebook "friends" that the target user has, those friends that comment or "like" the target user's posts, information on who the target user adds/removes as a friend, duration of the target user's friends (e.g., how long after the user adds them as a friend does the target user remove them as a friend), who the target user messages, which posts the target user shares, and length of tenure on the social network. For a peer trust score, such as peer trust score 304, the network connectivity component may take into account number of mutual friends, degree of separation, and number of paths from a first entity to the target entity.

Credit score component 408 may comprise any suitable financial information associated with the target entity, including income, checking/savings account information (number of accounts, value), and credit score information from one or more institutions. The credit score information may be received from any typical credit score agency, including, but not limited to, Transunion, Equifax, and Experian. Credit score factors may also be taken into account, such as number of credit accounts, credit utilization, length of credit history, number of late payments, etc. Other financial information taken into account may include prior loan and payment data, data on net worth or assets/liabilities, and information on any prior infractions. The various financial data may be combined using any suitable approach, including, but not limited to, the methods discussed below in relation to FIGS. 8 and 9.

Court data component 410 may include any data on activity associated with the target entity in a criminal or civil court. For example, court data component 410 may comprise data on how many cases involve the entity suing someone else and the type of suit, how many cases involve the target entity as the defendant, any criminal cases that may have a negative impact on trustworthiness, and the final holding/disposition of any concluded cases (e.g., acquitted, convicted, settled, etc.). Court data may be derived from any publicly available sources and from any available municipal, state, federal, or international court.

A ratings/feedback data component 412 may include any data that reflects a rating or feedback associated with the target entity. For instance, online rating sites such as Yelp may provide ratings information on various businesses. Any ratings of the target entity, information on volume, number of ratings, average rating, who rates the target entity, and whether the target entity responds to comments may be taken into account. In some embodiments, ratings data may be received from ratings institutions, such as the Better Business Bureau. Feedback data may include any positive or negative comments associated with the target entity. In some embodiments, feedback data may include comments made by peers in a social network. In some embodiments, the number and timing of ratings by other users or entities may be used to affect the ratings/feedback data component 412. For instance, a lack of negative feedback for a specified period of time may result in an increase (or decrease) in the ratings/feedback data component 412. Similarly, a lack of positive feedback for a specified period of time may result in a decrease (or increase) in the ratings/feedback data component 412.

Group/demographics component 414 may include information on group membership of the target entity or demographic information such as age, sex, race, location, etc. The group data may suggest an activity performed by the target entity. For instance, membership to a national sailing club may indicate an interest in sailing and boats. In some embodiments, a peer trust score may be adjusted to take into account the group/demographic component. For instance, the peer trust score for a target entity may be increased if a first entity and the target entity are both members of the same national sailing club. As another example, similarities in demographic information (age, sex, race, location, etc.) may indicate an incremental increase in trustworthiness between a first and the target entity, and the peer trust score for the target entity may be adjusted accordingly.

The search engine mining component 416 may include analytics performed on suitable search engines, such as Google or Yahoo. Websites/blogs/articles may be searched and scanned for entries about the target entry and a positive or negative sentiment may be detected and stored for such entries. Number of articles, sentiment, timing of the articles, may indicate a positive or negative adjustment to the search engine mining component 416. In some embodiments, online shopping or auction websites such as eBay may be scanned for information associated with the target entity, such as rating and volume of transactions, feedback comments, number of bought/sold items, average value of items, and category of items (e.g., hardware, software, furniture, etc.).

Transaction history component 418 may comprise any information on past transactions associated with the target entity. Successful transactions or activities may be identified and positively impact the transaction history component score. For example, if I loan John $100 and he promptly pays me back, I may be more inclined to loan him money in the future. Transaction history data may be locally tracked and stored (e.g., by application 102 in FIG. 2) or may be received from remote sources (e.g., a bank or website). The transaction history data may factor in details of the transaction, such as amount of money, to whom, from whom, how many times, and/or success rate. Transaction/activity types may include, but are not limited to, loan/borrow funds or objects, buy from/sell to goods and services, financial transactions, dating, partner with (e.g., develop an alliance, start a new business with, invest with, etc.), becoming friends/acquaintances, rent to/from (including, e.g., renting cars, houses, hotel rooms, etc.), hire/work for (including, e.g., plumber, babysitter, etc.). The activity or transactions may include any number of parties, and each party may need to verify that they were in fact part of the activity/transaction. Each party may also rate their experience with the transaction/activity. Reminders for uncompleted activity/transactions may be automatically sent to a user or entity. For example, an email may be sent asking whether the user would like to provide feedback.

In some embodiments, the transactions history component 418 may comprise interactions between previous transactions in the transaction history between a first entity and a second entity. In this manner, processing circuitry may take into account elements of regret and forgiveness in determining a trust score. For example, a first transaction may correspond to an increase or decrease in a trust score, while a second, subsequent transaction related to the first transaction may result in an adjustment to the peer trust score in the opposite direction. The adjustment may be either a decrease in the trust score (e.g., regret or suspicion) or an increase in the trust score (e.g., forgiveness or redemption). As an illustrative example, a subject may have stolen a car in the past and be subsequently convicted of the theft and sentenced to serve 3 years in prison for the crime. The initial theft may serve to decrease the subject's trust score, reflecting the increased suspicion associated with a known delinquent, while the subsequent conviction and sentence might serve to increase the subject's trust score, reflecting a level of redemption in the trustworthiness of the subject.

In some embodiments, the transactions that comprise the transactions history component 418 may be associated with an increase or decrease in a trust score over time. For example, a transaction may contribute to an initial increase in a trust score, and over time, the initial increase may decay until the trust score returns to an initial value. Similarly, a transaction may cause an initial decrease in a trust score, and over time, the initial decrease may decay until the trust score returns to an initial value.

In some embodiments, any one of the system, peer, or contextual trust score may also include a location component that takes into account a geographic location of an entity. For example, the location of an end user as determined by GPS coordinates or an address of a business may be incorporated into the calculation of a trust score. In some embodiments, a peer trust score may take into account the location of a first entity and a second entity and adjust the trust score accordingly. For instance, if a first user and a second user happen to be from the same hometown, then the peer trust scores may be increase to reflect this common information. In some embodiments, the location of the entity may provide an automatic increase/decrease in the trust score. For instance, a particular location may be known as a dangerous neighborhood, city, or region, and the trust scores of all entities located or associated with the dangerous location may be automatically decreased to reflect this danger. As an illustrative example, a user who travels to a country close to a known warzone may not be as comfortable trusting strangers in the country. The trust levels of others located in the same location as the user may be automatically decreased to reflect the increased suspicion. In some embodiments, the user may be traveling with his friends, as indicated by the high level of peer trust scores the user has with the plurality of people located around the user. Processing circuitry may determine that the user is surrounded by friends in any suitable manner, including explicit indications of friendship, common hometown, place of work, or any other common information. If the user is traveling to a dangerous location, but is traveling with friends, then the trust scores of other entities associated with the dangerous location may still be decreased, but they may be decreased by a smaller amount than if the user was not traveling with friends.

In some embodiments, any of the system, peer, and/or contextual trust scores may take into account biological responses of an end user. For instance, mobile devices may include cell phones, smart watches, heart rate monitors, and other wearable mobile devices that can monitor one or more biological responses of an end user (e.g., heart rate, breathing rate, brain waves, sweat response, etc.). These detected biological responses of an end user, in conjunction with location information, may be used, in part, to determine a trust score. For example, an increase in heart rate may be an indication of anxiety, and may result in a decrease in trust score. The increase in heart rate may be caused by the user moving to a new location, in which case the trust score associated with that location may be decreased. The increase in heart rate may have been caused by a first user moving into close proximity with a second user, in which case the peer trust score with respect to the second user may be decreased, to reflect the increased anxiety that the first user feels around the second user.

Figure 5:
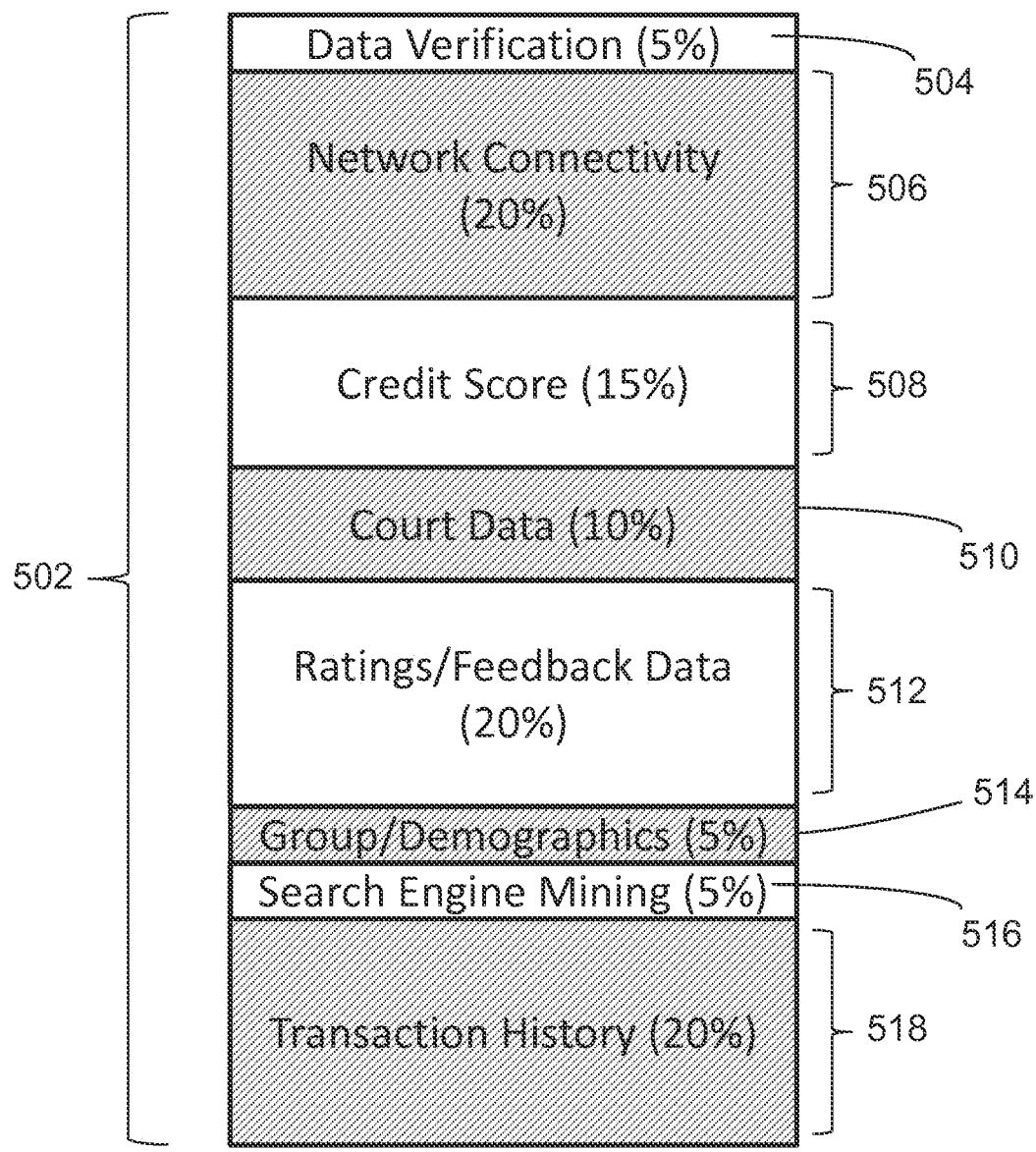
FIG. 5 is a diagram of an illustrative weighted combination of components that comprise a system trust score.

FIG. 5 is a diagram 500 of a weighted combination 502 of components 504-518 that comprise a trust score in accordance with certain embodiments of the present disclosure. It will be understood that a trust score may comprise more or fewer components than components 504-518 and that components 504-518 are provided for illustrative purposes only. Weighted combination 502 comprises a data verification component 504, a network connectivity component 506, a credit score component 508, a court data component 510, a ratings/feedback data component 512, a group/demographics component 514, a search engine mining component 516, and a transaction history component 518. The components 504-518 may correspond respectively to data verification component 404, network connectivity component 406, credit score component 408, court data component 410, ratings/feedback data component 412, group/demographics component 414, search engine mining component 416, and transaction history component 418 depicted in FIG. 4. As shown in the illustrative example depicted in FIG. 5, the components 504-518 may be combined using a default weighting according to the following weights:

Data Verification—5%
Network Connectivity—20%
Credit Score—15%
Court Data—10%
Ratings/Feedback Data—20%
Group/Demographics—5%
Search Engine Mining—5%
Transaction History—20%

The components 504-518 may be combined using the above weights using a weighted sum. For example, each of the component 504-518 may be associated with a numerical component score. The weighted sum 502 may be calculated as:

$$S = \sum_{i=1}^{n} w_i c_i$$

wherein $w_i$ is the weighting as given by the default weighting above, and $c_i$ is the component score.

In some embodiments, the default weightings may be adjusted according to user-specified values. For example, as discussed above, users who care more about network connectivity may increase the weighting for the network connectivity component 506, and users who care less about financial responsibility may choose to decrease credit score component 508. In some embodiments, the default weightings above may be automatically adjusted, for example by application 102, to reflect a peer trust score or contextual trust score. For example, application 102 may detect that a first and second entity are entering into a financial transaction and may automatically adjust the weight for the credit score component 508 to reflect the importance of this component to the type of activity. Thus, the users may be provided with an contextual trust score that weights factors in a more relevant manner than the default weightings.

In some embodiments, at least one of the system trust score, peer trust score, and contextual trust score may be represented by a mean value and confidence band. The confidence band may represent a statistical variance in the calculated trust score. For example, each of the component scores may be associated with a mean score μ and a standard deviation σ based on how trustworthy the data source is. The mean and standard deviation for each of the component scores may be combined accordingly. As will be understood by those of ordinary skill in the art, the mean value of the total component scores may be represented by a sum of the mean value of each component score. The variance of two component scores together may be combined using the following equation:

$$V(A+B)=V(A)+V(B)+2*\text{Covar}(A,B)$$

where V(A) is the variance (i.e., the square of the standard deviation) of component A, V(B) is the variance of component B, and Covar(A,B) is the covariance of components A and B.

Figure 6:
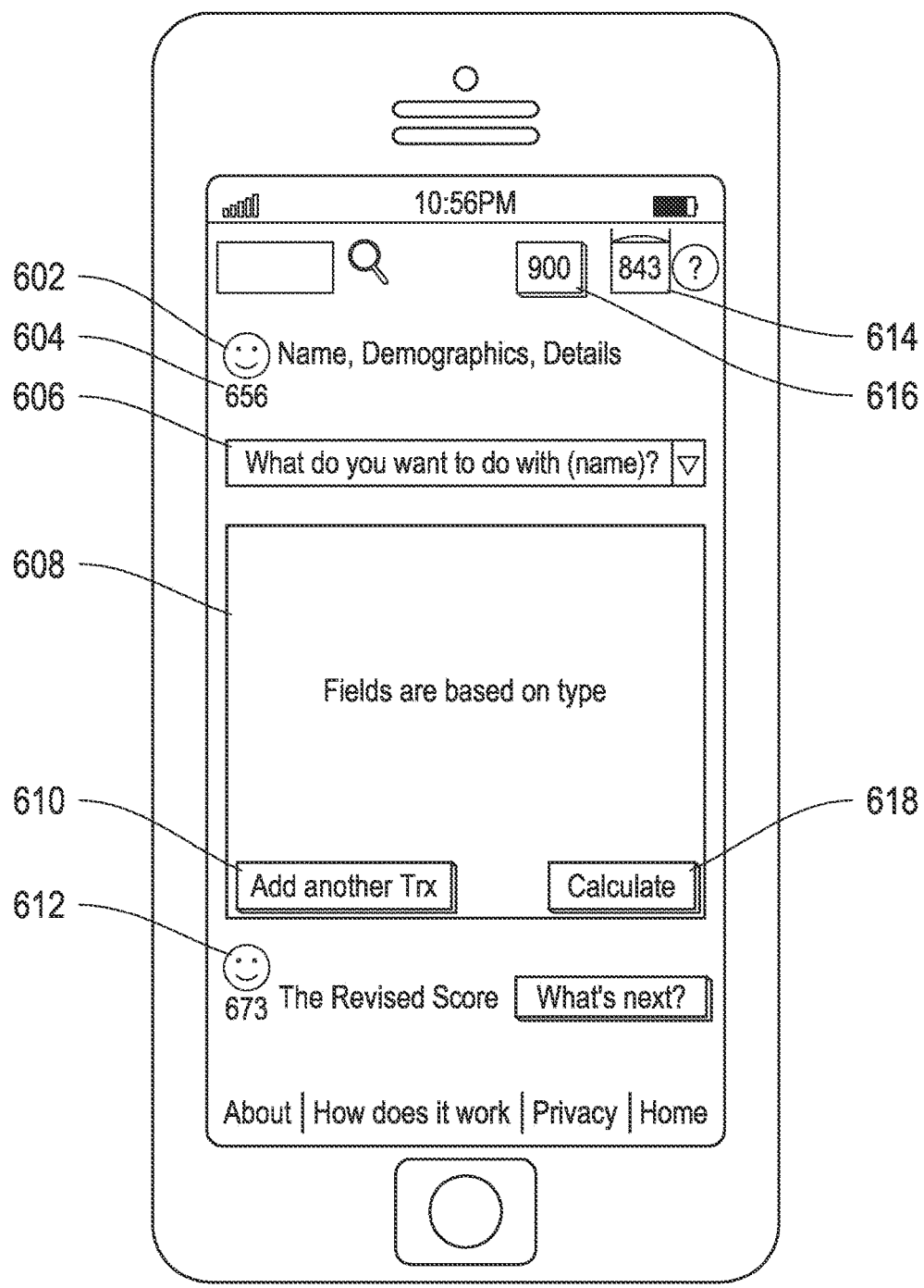
FIG. 6 is an illustrative graphical user interface displaying a trust score interface.

FIG. 6 is a graphical user interface displaying a trust score interface 600 to a requesting user in accordance with certain embodiments of the present disclosure. Trust score interface 600 includes icon 602, initial score 604, transaction selector 606, transaction details field 608, additional transaction button 610, revised score icon 612, first profile score 614, second profile score 616, and calculate button 618. Although the trust score interface 600 is depicted in FIG. 6 in the context of a mobile device display screen, it will be understood that trust score interface 600 may be generated for display on any suitable display device.

Icon 602 and initial score 604 may graphically represent a first trust score of a target entity. Although icon 602 is depicted as a smiley face, it will be understood that any suitable graphical representation may be utilized to represent a relative trust level of the target entity. In some embodiments, the initial score 604 may be a system trust score for the target entity calculated using a default set of weights. In other embodiments, the initial score 604 may be a peer trust score calculated in relation to the user of the mobile app. For instance, the initial score 604 may represent a trust level that takes into account mutual friends of the requesting user and the target user.

The requesting user may use transaction selector 606 to indicate an activity/transaction to be performed with the target user. In some embodiments, transaction selector 606 may be optional, and no transaction is needed to calculate a revised score. Although transaction selector 606 is depicted as a dropdown box, any suitable input method (e.g., text input box, radio buttons, etc.) may be utilized to receive an indication of an activity/transaction from the requesting user. After an activity/transaction is selected, transaction details field 608 may provide further details or options. For example, if the requesting user indicates that the target entity wishes to request a loan, then the transaction details field 608 may include a field for indicating the amount of the loan. In this manner, a different weighting of components may be used for a $10 loan as opposed to a $100,000 loan. The requesting user may add an additional transaction using additional transaction button 610. In cases where multiple transactions are indicated, weightings for the multiple transactions may be averaged.

Revised score icon 612 may indicate a revised trust score calculated based on the information entered into transaction selector 606 and transaction details field 608. In some embodiments, the revised score icon 612 may reflect a peer trust score, for example, when a transaction is not selected in transaction selector 606. In other embodiments, the revised score icon 612 may reflect a contextual trust score calculated based on the activity/transaction and transaction details indicated in transaction selector 606 and transaction details field 608. The revised score icon 612 may include a graphical representation of the revised trust score, similar to icon 602. In the illustrative example depicted in FIG. 6, revised icon 612 includes a smiley face to represent a relatively high revised score of 673. The requesting user may request a calculation using calculation button 618.

The first profile score 614 and the second profile score 616 may indicate one or more of a system trust score, peer trust score, and/or contextual trust score for the requesting user. As with icon 602 and icon 612, the first profile score 614 and second profile score 616 may include a graphical representation, such as a smiley face, of the respective trust score.

Figure 7:
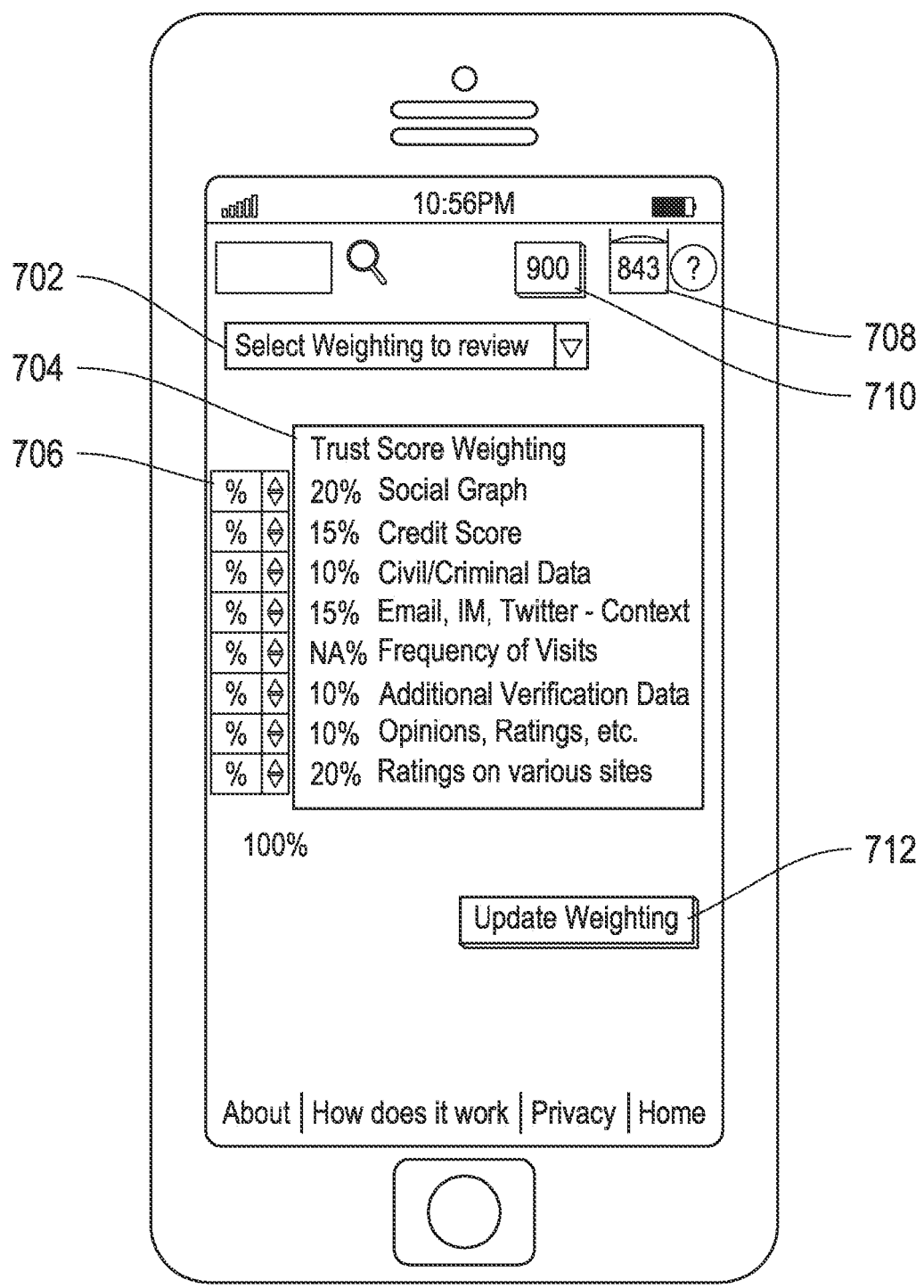
FIG. 7 is a graphical user interface displaying another illustrative trust score interface.

FIG. 7 is a graphical user interface displaying another trust score interface 700 in accordance with certain embodiments of the present disclosure. Trust score interface 700 includes weighting profile selector 702, weighting details field 704, weighting selector 706, first profile score 708, second profile score 710, and update weighting button 712.

As discussed above in relation to FIG. 5, a user may adjust weightings to user-specified value. These user-specified weightings may be saved as profiles which may be selected in weighting profile selector 702. Weighting details field 704 may reflect the details, such as weighting values of the various components, that correspond to the selected weighting profile. A user may further adjust the weightings using weighting selector 706. Although weighting profile selector 704 and weighting selector 706 are depicted in FIG. 7 as dropdown menus, any suitable selector may be utilized, including, but not limited to, text input boxes and/or radio buttons. The requesting user may update the weighting profile with the specified weights by selecting update weighting button 712.

In some embodiments, the weighting profiles may be stored, for example in data store 110 depicted in FIG. 1. These weighting profiles may form the basis for developing default weighting profiles specific to a particular transaction type. These default weighting profiles for specific transaction types may be suggested to other users, and the system, using processing circuitry, may use AI/machine learning techniques in order to monitor how users are adjusting the weighting profiles and automatically readjust the default weighting profiles for other users. By doing so, the system may improve response time and convenience for the end users, since they will not have to manually adjust their weighting profiles.

In some embodiments, the user may indicate an initial or base trust score factor that may be applied to every other user. At least one of the system trust score, peer trust score, and contextual trust score may then be calculated as updates to the initial or base trust score that the user has indicated. For example, each of the components discussed in relation with FIG. 4 may result in an increase or decrease in the indicated initial or base trust score. In some embodiments, the initial or base trust score may be determined by presenting a questionnaire or series of questions to the user to determine their general trust level towards other entities. In some embodiments the user may specify different initial or base trust scores for different entities.

First profile score 708 and second profile score 710 may be substantially similar to first profile score 614 and second profile score 616 depicted in FIG. 6 and may indicate one or more of a system trust score, peer trust score, and/or contextual trust score for the requesting user.

FIG. 8 is a table 800 showing a graded scale for assigning component scores based on a metric in accordance with certain embodiments of the present disclosure. Table 800 depicts but one illustrative example for determining a component score or subcomponent score based on a measured metric 802. The illustrative example depicted in FIG. 8 uses number of friends in a social network as a measurable metric. Based on metric 802, component scores 804 and 806 may be assigned according to a graded scale. In the example depicted in FIG. 8, the component score 804 is depicted as a numerical score out of 1000, and the component score 806 is depicted as a percentage out of 100%. It will be understood that any suitable method for depicting the component score may be used. For example, the component score may be a represented by discrete categories (e.g., "very bad," "bad," "ok," "good," and "very good"). Furthermore, although the graded scale depicted in FIG. 8 shows only five steps, the graded scale may be divided into any suitable number of steps or categories.

According to the graded scale depicted in FIG. 8, the network component score (e.g., network connectivity score 406 in FIG. 4) may be assigned based on the number of friends the target entity has. For example, if the target entity has 306 friends, the network component score may be 600. In some embodiments, the network component score may comprise a combination of two or more subcomponent scores, wherein each subcomponent score is determined based on a grade scale similar to table 800. In some embodiments, the subcomponent scores may also be determined based on the method discussed below in relation to FIG. 9. In some embodiments, the subcomponent scores may be combined using an average or a weighted average. For example, the network component score may combine the number of friends and the number of "likes" a target user has received on their posts. The network component score may be weighted so that the number of friends accounts for 700/1000 of the potential network component score, and the number of "likes" accounts for 300/1000 of the potential network component score.

The metric 802 and the steps of the graded scale may be determined by a server, such as application server 106 depicted in FIG. 1. For example, the provider of the trust app may set the metric according to their proprietary algorithm. In some embodiments, the metric 802 may be adjusted by an entity such that the component score may be calculated according to the user's preferences. Although the metric 802 is discussed with respect to a network connectivity score, it will be understood that any of the components 404-418, or any other components, may be determined using a similar graded scale scheme.

Figure 9:
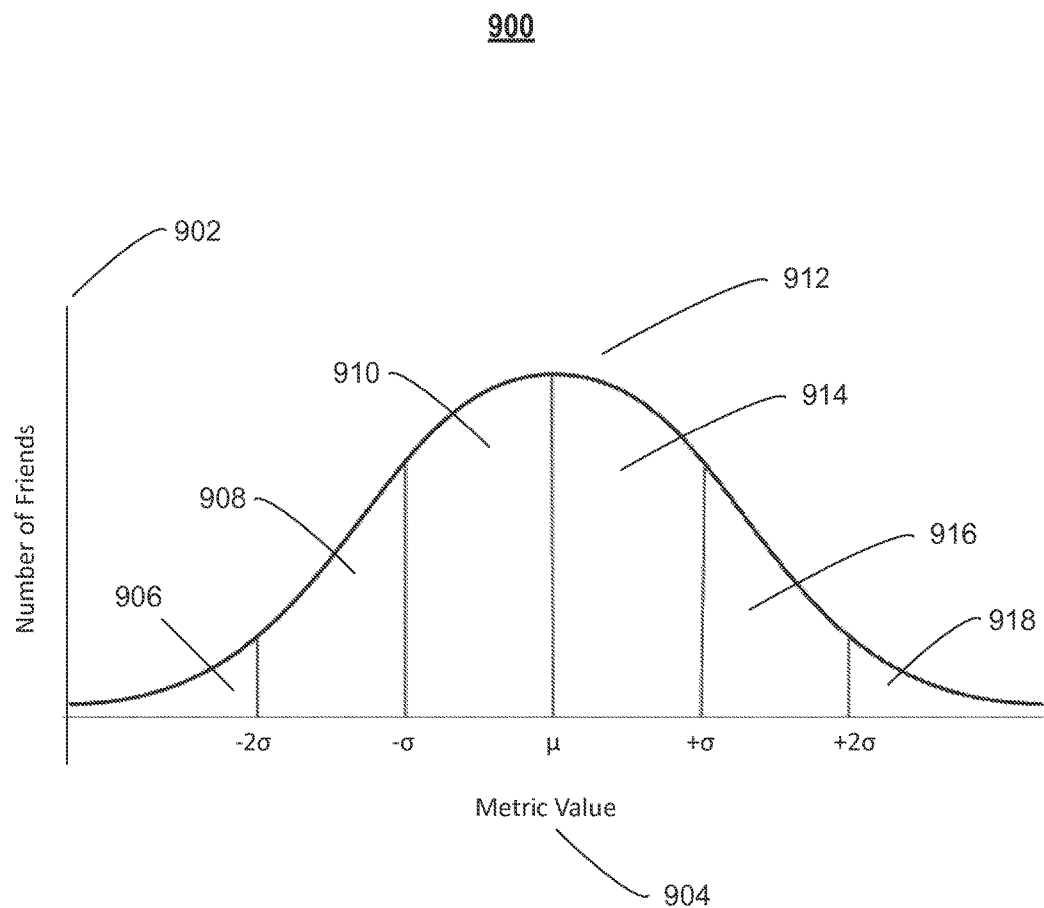
FIG. 9 is an illustrative distribution for assigning component scores based on a metric.

FIG. 9 is a distribution 900 for assigning component scores based on a metric in accordance with certain embodiments of the present disclosure. Distribution 900 depicts one illustrative example for determining a component score or subcomponent score based on a measured metric 902. The illustrative example depicted in FIG. 9 uses number of friends in a social network as a measurable metric 904. An application (such as access application 102 in FIG. 1) or an application server (such as application server 106 in FIG. 1) may identify entities connected to a requesting user through a network. In some embodiments, the network may be a social network (such as Facebook) or a computer network (such as the Internet or a subset of the Internet). The application or application server may then determine or retrieve, for each identified user, information on the desired metric 904. In the illustrative example depicted in FIG. 9, the application or application server may identify all of the requesting user's friends and determine how many friends each of the user's friends has. Distribution 900 may be graphed based on the determined or retrieved information. In FIG. 9, distribution 900 is depicted as a Gaussian distribution, but it will be understood that any distribution may result from the determined or retrieved data. The distribution 900 may have a peak 912 at an average value $\mu$. For instance, most of a requesting user's friends may have an average value of $\mu=500$ friends. The distribution 900 may be divided into regions 906, 908, 910, 914, 916, and 918 based on a standard deviation $\sigma$. For example, region 906 may represent a number of friends that is two standard deviations $\sigma$ below the average value $\mu$. Region 908 may represent a number of friends that is between two standard deviations $\sigma$ and one standard deviation $\sigma$ below the average value $\mu$. Region 910 may represent a number of friends that is less than one standard deviation $\sigma$ below the average value $\mu$. Region 914 may represent a number of friends that is between the average value $\mu$ and one standard deviation $\sigma$ above the average value $\mu$. Region 916 may represent a number of friends that is between one standard deviation $\sigma$ and two standard deviations $\sigma$ above the average value $\mu$. Finally, region 918 may represent a number of friends that is above two standard deviations $\sigma$ above the average value $\mu$.

The metric for the target user may fall into one of regions 906, 908, 910, 914, 916, and 918. As will be understood by those of ordinary skill in the art, regions 906 and 918 represent about 2.5% each of distribution 900, regions 908 and 916 represent about 13.5% each of distribution 900, and regions 910 and 914 represent about 34% each of distribution 900. The application or application server may assign a component score depending on which of regions 906, 908, 910, 914, 916, and 918 the metric of the target user falls into. For instance, the component score for the target user may be relatively low if the metric falls within regions 906 or 918 and may be relatively high if the metric falls within regions 910 or 914. A graded scale, similar to table 800 depicted in FIG. 8, may be assigned to the regions 906, 908, 910, 914, 916, and 918.

Figure 10:
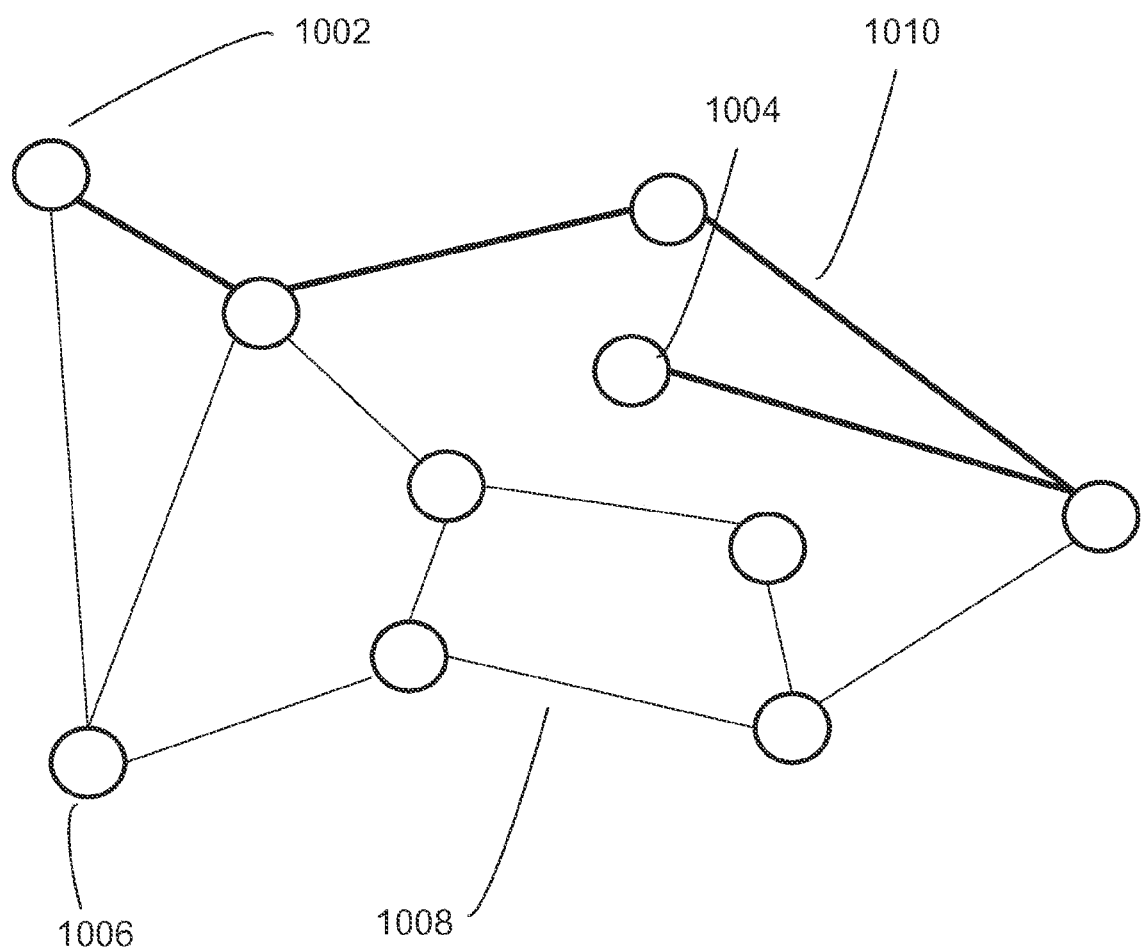
FIG. 10 is a display of an illustrative network graph.

FIG. 10 is a display of a network graph 1000 in accordance with certain embodiments of the present disclosure. Network graph 1000 includes source node 1002, target node 1004, intermediate node 1006, and paths 1008 and 1010. The network graph 1000 may be generated for display on any suitable display device and in any suitable interface, such as the interfaces 600 and 700 depicted in FIGS. 6 and 7. As defined herein, a "node" may include any user terminal, network device, computer, mobile device, access point, or any other electronic device. In some embodiments, a node may also represent an individual human being, entity (e.g., a legal entity, such as a public or private company, corporation, limited liability company (LLC), partnership, sole proprietorship, or charitable organization), concept (e.g., a social networking group), animal, or inanimate object (e.g., a car, aircraft, or tool).

The network graph 1000 may represent a visualization of a network that connects a requesting entity, depicted by source node 1002, and a target entity, depicted by target node 1004. One or more intermediate nodes, such as intermediate node 1006, may also be displayed, as well as paths 1008 that connect nodes 1002, 1004, and 1006. In some embodiments, a dominant path 1010 may be displayed and visually distinguished from other paths 1008. The dominant path 1010 may be determined using any suitable algorithm. For example, the dominant path 1010 may represent the shortest-length path from source node 1002 to source node 1004.

In other embodiments, the dominant path 1010 may represent a path through specific intermediate nodes, such as nodes with relatively high trust values. For example, a longer path from node 1002 through node 1006 to node 1004 may have higher trust at each link of the path than the shorter path 1010.

In some embodiments, each of the nodes 1002, 1004, and 1006 may include images, text, or both, such as a profile picture associated with the entity depicted by the nodes. In some embodiments, the network graph 1000 may be generated for display in a scrollable display, wherein a user may scroll and zoom the network graph 1000 to see more and less nodes as desired.

Figure 11:
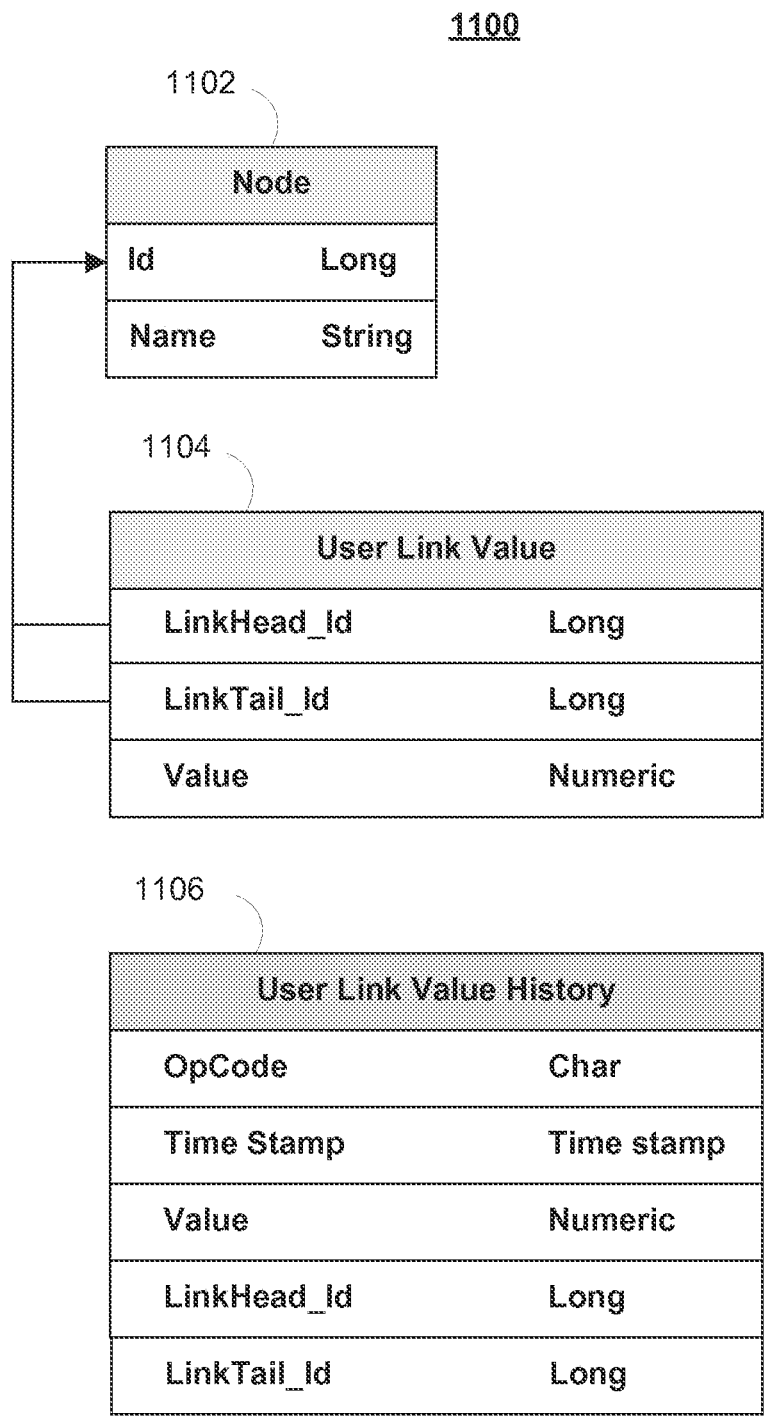
FIG. 11 is an illustrative data table for supporting connectivity determinations within a network community.
Figure 12:
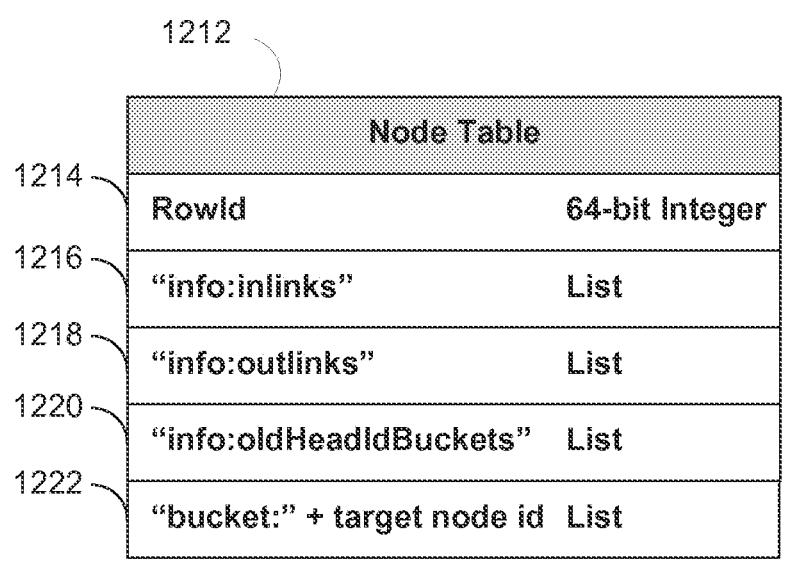
FIG. 12 is another illustrative data table for supporting connectivity determinations within a network community.

FIGS. 11-13 describe illustrative methods for calculating a network component score, such as network connectivity component 406 depicted in FIG. 4. Connectivity may be determined, at least in part, using various graph traversal and normalization techniques described in more detail below.

In an embodiment, a path counting approach may be used where processing circuitry is configured to count the number of paths between a first node $n_1$ and a second node $n_2$ within a network community. A connectivity rating $R_{n1n2}$ may then be assigned to the nodes. The assigned connectivity rating may be proportional to the number of subpaths, or relationships, connecting the two nodes, among other possible measures. Using the number of subpaths as a measure, a path with one or more intermediate nodes between the first node $n_1$ and the second node $n_2$ may be scaled by an appropriate number (e.g., the number of intermediate nodes) and this scaled number may be used to calculate the connectivity rating.

In some embodiments, weighted links are used in addition to or as an alternative to the subpath counting approach. Processing circuitry may be configured to assign a relative user weight to each path connecting a first node $n_1$ and a second node $n_2$ within a network community. A user connectivity value may be assigned to each link. For example, a user or entity associated with node $n_1$ may assign user connectivity values for all outgoing paths from node $n_1$. In some embodiments, the connectivity values assigned by the user or entity may be indicative of that user or entity's trust in the user or entity associated with node $n_2$. The link values assigned by a particular user or entity may then be compared to each other to determine a relative user weight for each link.

The relative user weight for each link may be determined by first computing the average of all the user connectivity values assigned by that user (i.e., the out-link values). If $t_i$ is the user connectivity value assigned to link i, then the relative user weight, $w_i$, assigned to that link may be given in accordance with:

$$w_i = 1 + (t_i - \bar{t_i})^2 \qquad (1)$$

To determine the overall weight of a path, in some embodiments, the weights of all the links along the path may be multiplied together. The overall path weight may then be given in accordance with:

$$w_{path} = \Pi(w_i) \qquad (2)$$

The connectivity value for the path may then be defined as the minimum user connectivity value of all the links in the path multiplied by the overall path weight in accordance with:

$$t_{path} = w_{path} \times t_{min} \qquad (3)$$

To determine path connectivity values, in some embodiments, a parallel computational framework or distributed computational framework (or both) may be used. For example, in one embodiment, a number of core processors implement an Apache Hadoop or Google MapReduce cluster. This cluster may perform some or all of the distributed computations in connection with determining new path link values and path weights.

The processing circuitry may identify a changed node within a network community. For example, a new outgoing link may be added, a link may be removed, or a user connectivity value may have been changed. In response to identifying a changed node, in some embodiments, the processing circuitry may re-compute link, path, and weight values associated with some or all nodes in the implicated network community or communities.

In some embodiments, only values associated with affected nodes in the network community are recomputed after a changed node is identified. If there exists at least one changed node in the network community, the changed node or nodes may first undergo a prepare process. The prepare process may include a "map" phase and "reduce" phase. In the map phase of the prepare process, the prepare process may be divided into smaller sub-processes which are then distributed to a core in the parallel computational framework cluster. For example, each node or link change (e.g., tail to out-link change and head to in-link change) may be mapped to a different core for parallel computation. In the reduce phase of the prepare process, each out-link's weight may be determined in accordance with equation (1). Each of the out-link weights may then be normalized by the sum of the out-link weights (or any other suitable value). The node table may then be updated for each changed node, its in-links, and its out-links.

After the changed nodes have been prepared, the paths originating from each changed node may be calculated. Once again, a "map" and "reduce" phase of this process may be defined. During this process, in some embodiments, a depth-first search may be performed of the node digraph or node tree. All affected ancestor nodes may then be identified and their paths recalculated.

In some embodiments, to improve performance, paths may be grouped by the last node in the path. For example, all paths ending with node $n_1$ may be grouped together, all paths ending with node $n_2$ may be grouped together, and so on. These path groups may then be stored separately (e.g., in different columns of a single database table). In some embodiments, the path groups may be stored in columns of a key-value store implementing an HBase cluster (or any other compressed, high performance database system, such as BigTable).

In some embodiments, one or more threshold functions may be defined. The threshold function or functions may be used to determine the maximum number of links in a path that will be analyzed in a connectivity determination or connectivity computation. Threshold factors may also be defined for minimum link weights, path weights, or both. Weights falling below a user-defined or system-defined threshold may be ignored in a connectivity determination or connectivity computation, while only weights of sufficient magnitude may be considered.

In some embodiments, a user connectivity value may represent the degree of trust between a first node and a second node. In one embodiment, node $n_1$ may assign a user connectivity value of $l_1$ to a link between it and node $n_2$. Node $n_2$ may also assign a user connectivity value of $l_2$ to a reverse link between it and node $n_1$. The values of $l_1$ and $l_2$ may be at least partially subjective indications of the trustworthiness of the individual or entity associated with the node connected by the link. A user (or other individual authorized by the node) may then assign this value to an outgoing link connecting the node to the individual or entity. Objective measures (e.g., data from third-party ratings agencies or credit bureaus) may also be used, in some embodiments, to form composite user connectivity values indicative of trust. The subjective, objective, or both types of measures may be automatically harvested or manually inputted for analysis.

FIG. 11 shows data tables 1100 used to support the connectivity determinations for calculating a network component score in accordance with certain embodiments of the present disclosure. One or more of tables 1100 may be stored in, for example, a relational database in data store 110 (FIG. 1). Table 1102 may store an identification of all the nodes registered in a network community. A unique identifier may be assigned to each node and stored in table 1102. In addition, a string name may be associated with each node and stored in table 1102. As described above, in some embodiments, nodes may represent individuals or entities, in which case the string name may include the individual or person's first and/or last name, nickname, handle, or entity name.

Table 1104 may store user connectivity values. In some embodiments, user connectivity values may be assigned automatically by the system (e.g., by application server 106 (FIG. 1)). For example, application server 106 (FIG. 1) may monitor all electronic interaction (e.g., electronic communication, electronic transactions, or both) between members of a network community. In some embodiments, a default user connectivity value (e.g., the link value 1) may be assigned initially to all links in the network community. After electronic interaction is identified between two or more nodes in the network community, user connectivity values may be adjusted upwards or downwards depending on the type of interaction between the nodes and the result of the interaction. For example, each simple email exchange between two nodes may automatically increase or decrease the user connectivity values connecting those two nodes by a fixed amount. More complicated interactions (e.g., product or service sales or inquiries) between two nodes may increase or decrease the user connectivity values connecting those two nodes by some larger fixed amount. In some embodiments, user connectivity values between two nodes may be increased unless a user or node indicates that the interaction was unfavorable, not successfully completed, or otherwise adverse. For example, a transaction may not have been timely executed or an email exchange may have been particularly displeasing. Adverse interactions may automatically decrease user connectivity values while all other interactions may increase user connectivity values (or have no effect). In addition, user connectivity values may be automatically harvested using outside sources. For example, third-party data sources (such as ratings agencies and credit bureaus) may be automatically queried for connectivity information. This connectivity information may include completely objective information, completely subjective information, composite information that is partially objective and partially subjective, any other suitable connectivity information, or any combination of the foregoing.

In some embodiments, user connectivity values may be manually assigned by members of the network community. These values may represent, for example, the degree or level of trust between two users or nodes or one node's assessment of another node's competence in some endeavor. User connectivity values may include a subjective component and an objective component in some embodiments. The subjective component may include a trustworthiness "score" indicative of how trustworthy a first user or node finds a second user, node, community, or subcommunity. This score or value may be entirely subjective and based on interactions between the two users, nodes, or communities. This manual user connectivity score may "override" one or more of the system trust score, peer trust score, or contextual trust score. When a user "overrides" one of the above trust scores with a manual trust score, the user-specified trust score may be provided concurrently with, or instead of, the overridden trust score.

In some embodiments, a system administrator may override one or more of the system trust score, peer trust score, or contextual trust score. For example, a system administrator may override a system trust score of an entity to take into account recent trends or events. When a trust score is overridden by the system administrator, the administrator's trust score may be provided concurrently with, or instead of, the overridden trust score. When the overridden trust score reaches a specified range or threshold of the administrator's trust score, the system may automatically revert back to the overridden trust score. As an illustrative example, the system administrator may decrease a system trust score of an entity that has taken negative public attention in the news. The overridden trust score will continue to be calculated by the system and will gradually reflect the negative public attention of the entity. When the overridden trust score reaches within a certain range of the administrator's trust level (e.g., within 10%), then the system will automatically revert back to the calculated score. In some embodiments, the administrator's trust score will be provided to a user with a notification that the score was overridden and/or a reason why the trust score was overridden.

Table 1104 may store an identification of a link head, link tail, and user connectivity value for the link. Links may or may not be bidirectional. For example, a user connectivity value from node $n_1$ to node $n_2$ may be different (and completely separate) than a link from node $n_2$ to node $n_1$. Especially in the trust context described above, each user can assign his or her own user connectivity value to a link (i.e., two users need not trust each other an equal amount in some embodiments).

Table 1106 may store an audit log of table 1104. Table 1106 may be analyzed to determine which nodes or links have changed in the network community. In some embodiments, a database trigger is used to automatically insert an audit record into table 1106 whenever a change of the data in table 1104 is detected. For example, a new link may be created, a link may be removed, or a user connectivity value may be changed. This audit log may allow for decisions related to connectivity values to be made prospectively (i.e., before an anticipated event). Such decisions may be made at the request of a user, or as part of an automated process. This prospective analysis may allow for the initiation of a transaction (or taking of some particular action) in a fluid and/or dynamic manner. After such a change is detected, the trigger may automatically create a new row in table 1106. Table 1106 may store an identification of the changed node, and identification of the changed link head, changed link tail, and the user connectivity value to be assigned to the changed link. Table 1106 may also store a timestamp indicative of the time of the change and an operation code. In some embodiments, operation codes may include "insert," "update," or "delete" operations, corresponding to whether a link was inserted, a user connectivity value was changed, or a link was deleted, respectively. Other operation codes may be used in other embodiments.

FIG. 12 shows data structure 1210 used to support the connectivity determinations of the present disclosure. In some embodiments, data structure 1210 may be stored using key-value store 112 (FIG. 1), while tables 1200 are stored in data store 110 (FIG. 1). As described above, key-value store 112 (FIG. 1) may implement an HBase storage system and include BigTable support. Like a traditional relational database management system, the data shown in FIG. 12 may be stored in tables. However, the BigTable support may allow for an arbitrary number of columns in each table, whereas traditional relational database management systems may require a fixed number of columns.

Data structure 1210 may include node table 1212. In the example shown in FIG. 12, node table 1212 includes several columns. Node table 1212 may include row identifier column 1214, which may store 64-bit, 128-bit, 256-bit, 512-bit, or 1024-bit integers and may be used to uniquely identify each row (e.g., each node) in node table 1212. Column 1216 may include a list of all the incoming links for the current node. Column 1218 may include a list of all the outgoing links for the current node. Column 1220 may include a list of node identifiers to which the current node is connected. A first node may be connected to a second node if outgoing links may be followed to reach the second node. For example, for A→B, A is connected to B, but B may not be connected to A. Node table 1212 may also include one or more "bucket" columns 1222. These columns may store a list of paths that connect the current node to a target node. As described above, grouping paths by the last node in the path (e.g., the target node) may facilitate connectivity computations. As shown in FIG. 12, in some embodiments, to facilitate scanning, bucket column names may include the target node identifier appended to the end of the "bucket:" column.

Figure 13A:
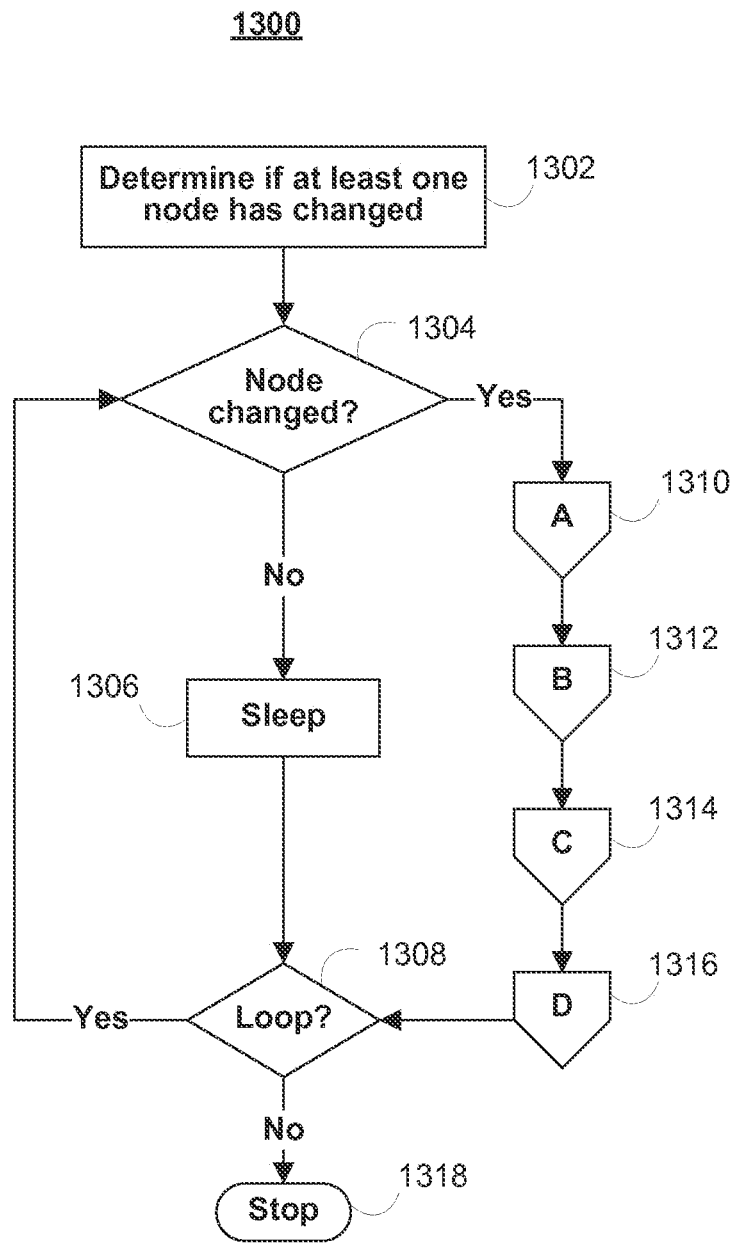
FIGS. 13A-E are illustrative processes for supporting connectivity determinations within a network community.

FIGS. 13A-13E show illustrative processes for determining the connectivity of nodes within a network community. The processes depicted in FIGS. 13A-13E may be used to determine a network component score, such as network connectivity component 406 depicted in FIG. 4. FIG. 13A shows process 1300 for updating a connectivity graph (or any other suitable data structure) associated with a network community. As described above, in some embodiments, each network community is associated with its own connectivity graph, digraph, tree, or other suitable data structure. In other embodiments, a plurality of network communities may share one or more connectivity graphs (or other data structure).

In some embodiments, the processes described with respect to FIGS. 13A-13E may be executed to make decisions prospectively (i.e., before an anticipated event). Such decisions may be made at the request of a user, or as part of an automated process. This prospective analysis may allow for the initiation of a transaction (or taking of some particular action) in a fluid and/or dynamic manner. In some embodiments, processing circuitry may anticipate an increase or decrease in a trust score as a result of making a certain decision. The processing circuitry may provide an alert to an end user, for example through one of user interface 600 or 700, that indicates to the end user that the trust score of the end user will increase/decrease as a result of the decision. In some embodiments, the prospective decision may also be made, either manually or automatically, based on the potential increase/decrease in trust score as a result of the decision. For example, processing circuitry may automatically make a prospective decision if the decision would result in an increase/decrease in a trust score within a certain threshold. In this manner, prospective decisions, whether made automatically or manually, may take into account a risk tolerance or risk preference of an end user.

At step 1302, a determination is made whether at least one node has changed in the network community. As described above, an audit record may be inserted into table 1106 (FIG. 11) after a node has changed. By analyzing table 1106 (FIG. 11), a determination may be made (e.g., by application server 106 of FIG. 1) that a new link has been added, an existing link has been removed, or a user connectivity value has changed. If, at step 1304, it is determined that a node has changed, then process 1300 continues to step 1310 (shown in FIG. 13B) to prepare the changed nodes, step 1312 (shown in FIG. 13C) to calculate paths originating from the changed nodes, step 1314 (shown in FIG. 13D) to remove paths that go through a changed node, and step 1316 (shown in FIG. 13E) to calculate paths that go through a changed node. It should be noted that more than one step or task shown in FIGS. 13B, 13C, 13D, and 13E may be performed in parallel using, for example, a cluster of cores. For example, multiple steps or tasks shown in FIG. 13B may be executed in parallel or in a distributed fashion, then multiple steps or tasks shown in FIG. 13C may be executed in parallel or in a distributed fashion, then multiple steps or tasks shown in FIG. 13D may be executed in parallel or in a distributed fashion, and then multiple steps or tasks shown in FIG. 13E may be executed in parallel or in a distributed fashion. In this way, overall latency associated with process 1300 may be reduced.

If a node change is not detected at step 1304, then process 1300 enters a sleep mode at step 1306. For example, in some embodiments, an application thread or process may continuously check to determine if at least one node or link has changed in the network community. In other embodiments, the application thread or process may periodically check for changed links and nodes every n seconds, where n is any positive number. After the paths are calculated that go through a changed node at step 1316 or after a period of sleep at step 1306, process 1300 may determine whether or not to loop at step 1308. For example, if all changed nodes have been updated, then process 1300 may stop at step 1318. If, however, there are more changed nodes or links to process, then process 1300 may loop at step 1308 and return to step 1304.

In practice, one or more steps shown in process 1300 may be combined with other steps, performed in any suitable order, performed in parallel (e.g., simultaneously or substantially simultaneously), or removed.

Figure 13B:
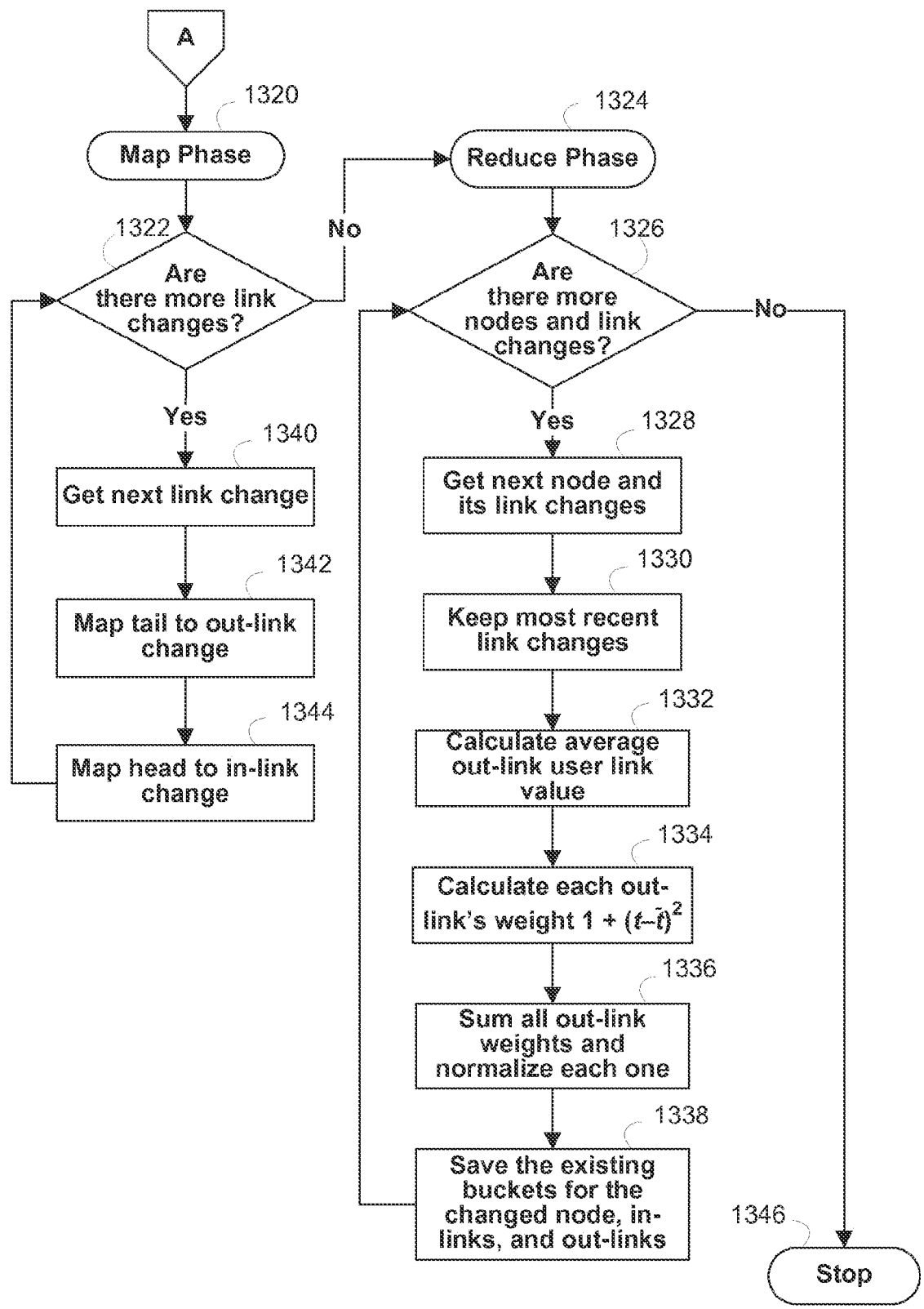

FIGS. 13B-13E each include processes with a "map" phase and "reduce" phase. As described above, these phases may form part of a map/reduce computational paradigm carried out by parallel computational framework 114 (FIG. 1), key-value store 112 (FIG. 1), or both. As shown in FIG. 13B, in order to prepare any changed nodes, map phase 1320 may include determining if there are any more link changes at step 1322, retrieving the next link change at step 1340, mapping the tail to out-link change at step 1342, and mapping the head to in-link change at step 1344.

If there are no more link changes at step 1322, then, in reduce phase 1324, a determination may be made at step 1326 that there are more nodes and link changes to process. If so, then the next node and its link changes may be retrieved at step 1328. The most recent link changes may be preserved at step 1330 while any intermediate link changes are replaced by more recent changes. For example, the timestamp stored in table 1106 (FIG. 11) may be used to determine the time of every link or node change. At step 1332, the average out-link user connectivity value may be calculated. For example, if node $n_1$ has eight out-links with assigned user connectivity values, these eight user connectivity values may be averaged at step 1332. At step 1334, each out-link's weight may be calculated in accordance with equation (1) above. All the out-link weights may then be summed and used to normalize each out-link weight at step 1336. For example, each out-link weight may be divided by the sum of all out-link weights. This may yield a weight between 0 and 1 for each out-link. At step 1338, the existing buckets for the changed node, in-links, and out-links may be saved. For example, the buckets may be saved in key-value store 112 (FIG. 1) or data store 110 (FIG. 1). If there are no more nodes and link changes to process at step 1326, the process may stop at step 1346.

Figure 13C:
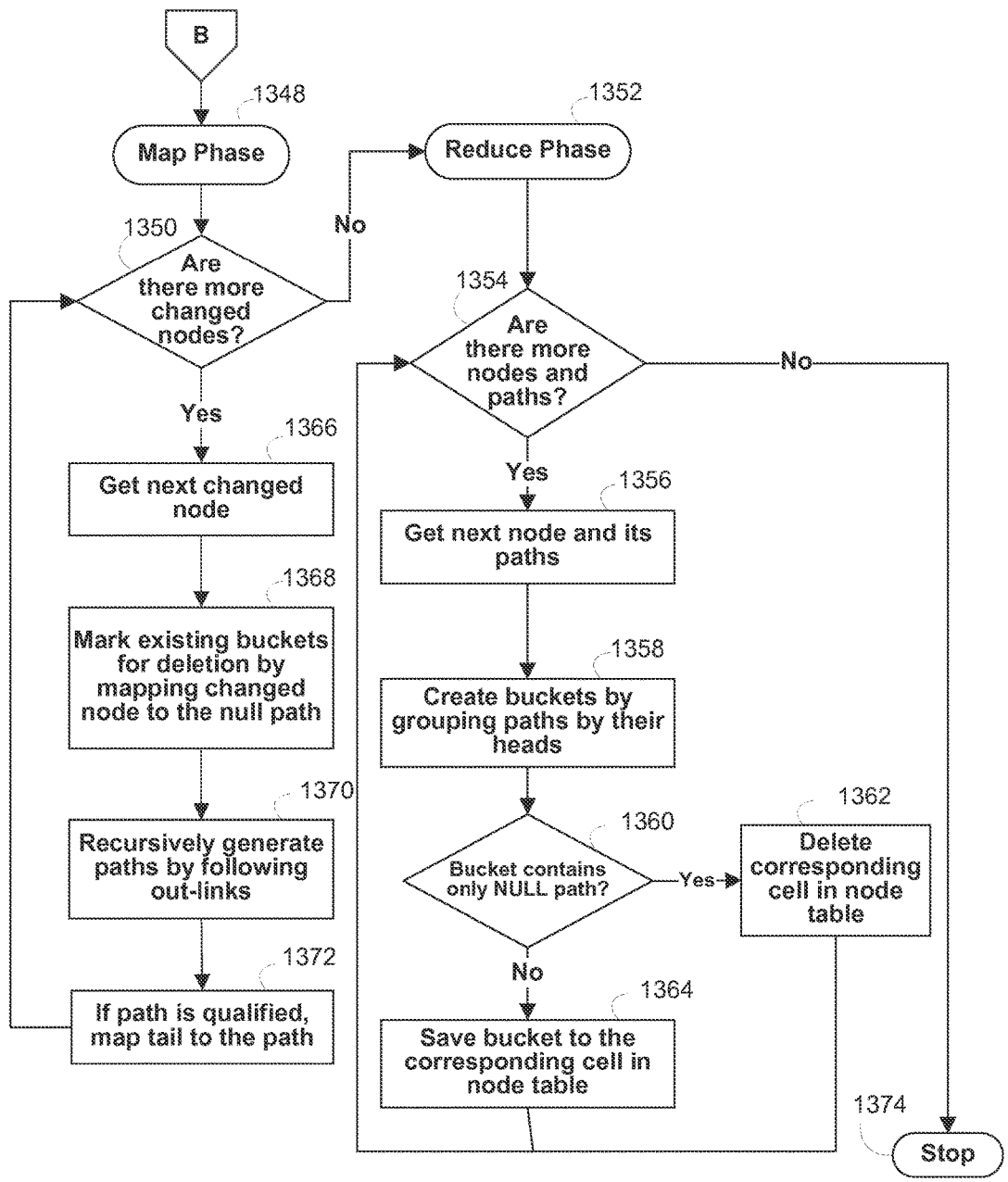

As shown in FIG. 13C, in order to calculate paths originating from changed nodes, map phase 1348 may include determining if there are any more changed nodes at step 1350, retrieving the next changed node at step 1366, marking existing buckets for deletion by mapping changed nodes to the NULL path at step 1368, recursively generating paths by following out-links at step 1370, and if the path is a qualified path, mapping the tail to the path. Qualified paths may include paths that satisfy one or more predefined threshold functions. For example, a threshold function may specify a minimum path weight. Paths with path weights greater than the minimum path weight may be designated as qualified paths.

If there are no more changed nodes at step 1350, then, in reduce phase 1352, a determination may be made at step 1354 that there are more nodes and paths to process. If so, then the next node and its paths may be retrieved at step 1356. At step 1358, buckets may be created by grouping paths by their head. If a bucket contains only the NULL path at step 1360, then the corresponding cell in the node table may be deleted at step 1362. If the bucket contains more than the NULL path, then at step 1364 the bucket is saved to the corresponding cell in the node table. If there are no more nodes and paths to process at step 1356, the process may stop at step 1374.

Figure 13D:
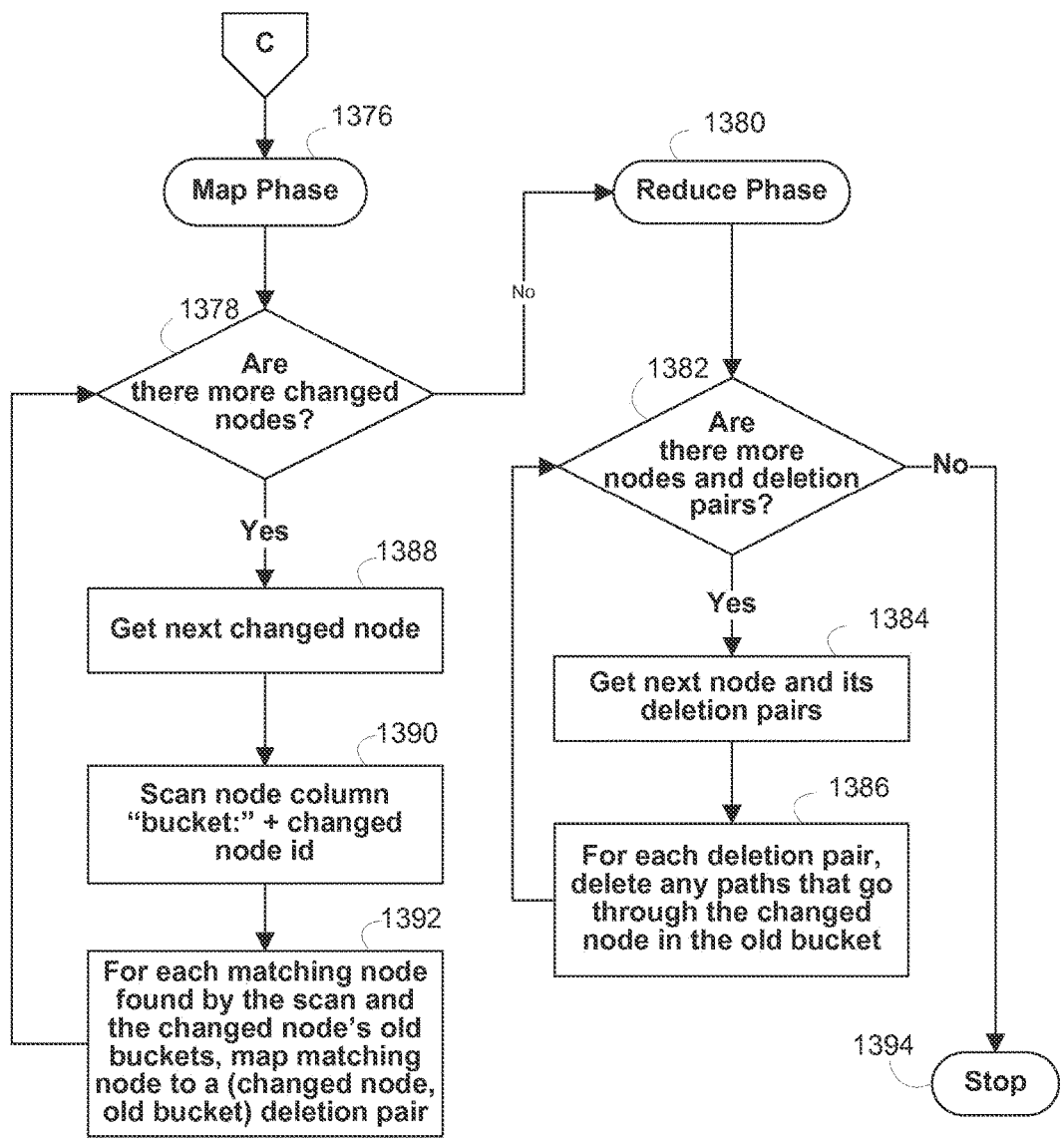

As shown in FIG. 13D, in order to remove paths that go through a changed node, map phase 1376 may include determining if there are any more changed nodes at step 1378 and retrieving the next changed node at step 1388. At step 1390, the "bucket:" column in the node table (e.g., column 1222 of node table 1212 (both of FIG. 12)) corresponding to the changed node may be scanned. For example, as described above, the target node identifier may be appended to the end of the "bucket:" column name. Each bucket may include a list of paths that connect the current node to the target node (e.g., the changed node). At step 1392, for each matching node found by the scan and the changed node's old buckets, the matching node may be matched to a (changed node, old bucket) deletion pair.

If there are no more changed nodes at step 1378, then, in reduce phase 1380, a determination may be made at step 1384 that there are more node and deletion pairs to process. If so, then the next node and its deletion pairs may be retrieved at step 1384. At step 1386, for each deletion pair, any paths that go through the changed node in the old bucket may be deleted. If there are no more nodes and deletion pairs to process at step 1382, the process may stop at step 1394.

Figure 13E:
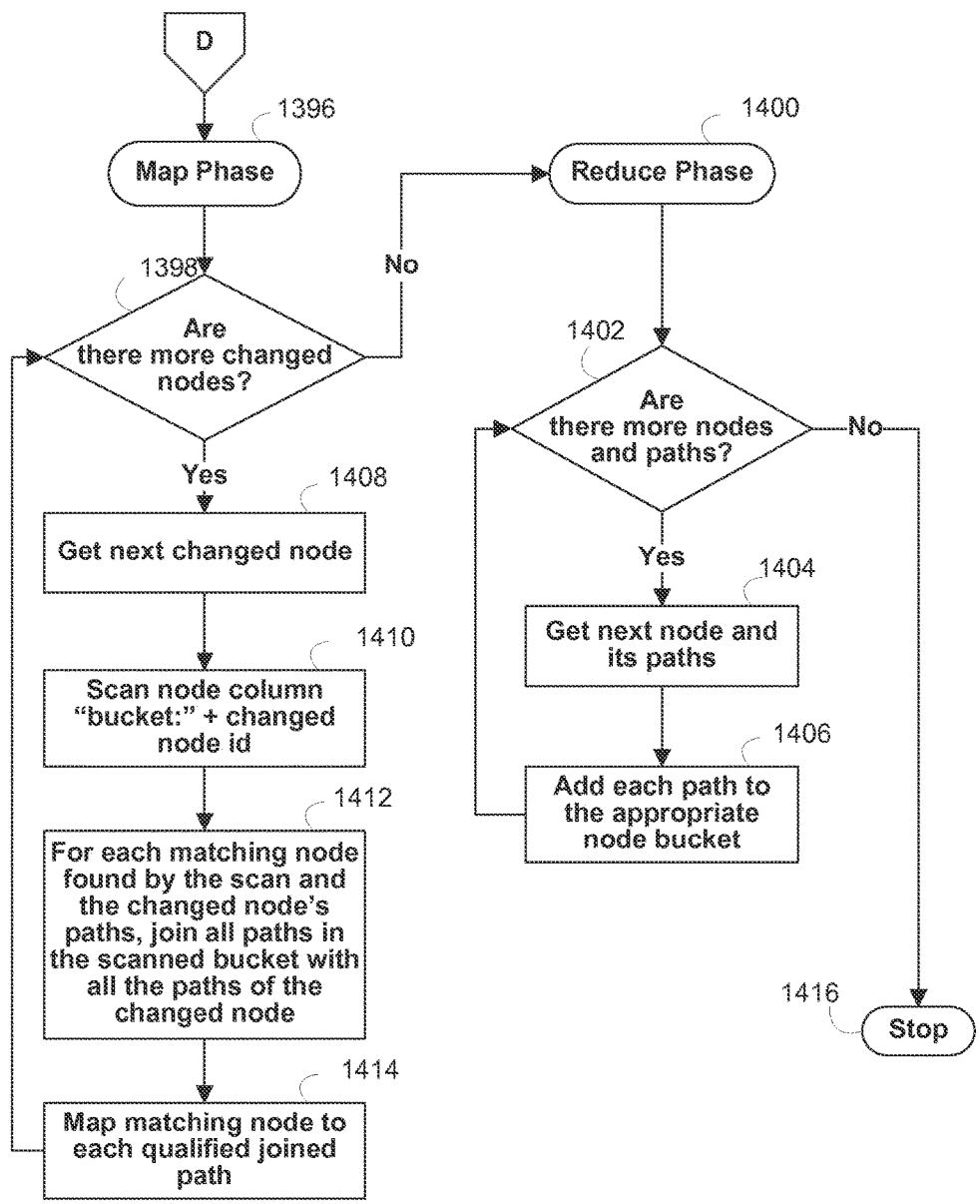

As shown in FIG. 13E, in order to calculate paths that go through a changed node, map phase 1396 may include determining if there are any more changed nodes at step 1398 and retrieving the next changed node at step 1408. At step 1410, the "bucket:" column in the node table (e.g., column 1222 of node table 1212 (both of FIG. 12)) corresponding to the changed node may be scanned. At step 1412, for each matching node found in the scan and the changed node's paths, all paths in the scanned bucket may be joined with all paths of the changed bucket. At step 1414, each matching node may be mapped to each qualified joined If there are no more changed nodes at step 1398, then, in reduce phase 1400, a determination may be made at step 1402 that there are more node and paths to process. If so, then the next node and its paths may be retrieved at step 1404. Each path may then be added to the appropriate node bucket at step 1406. If there are no more nodes and paths to process at step 1402, the process may stop at step 1416.

Figure 14:
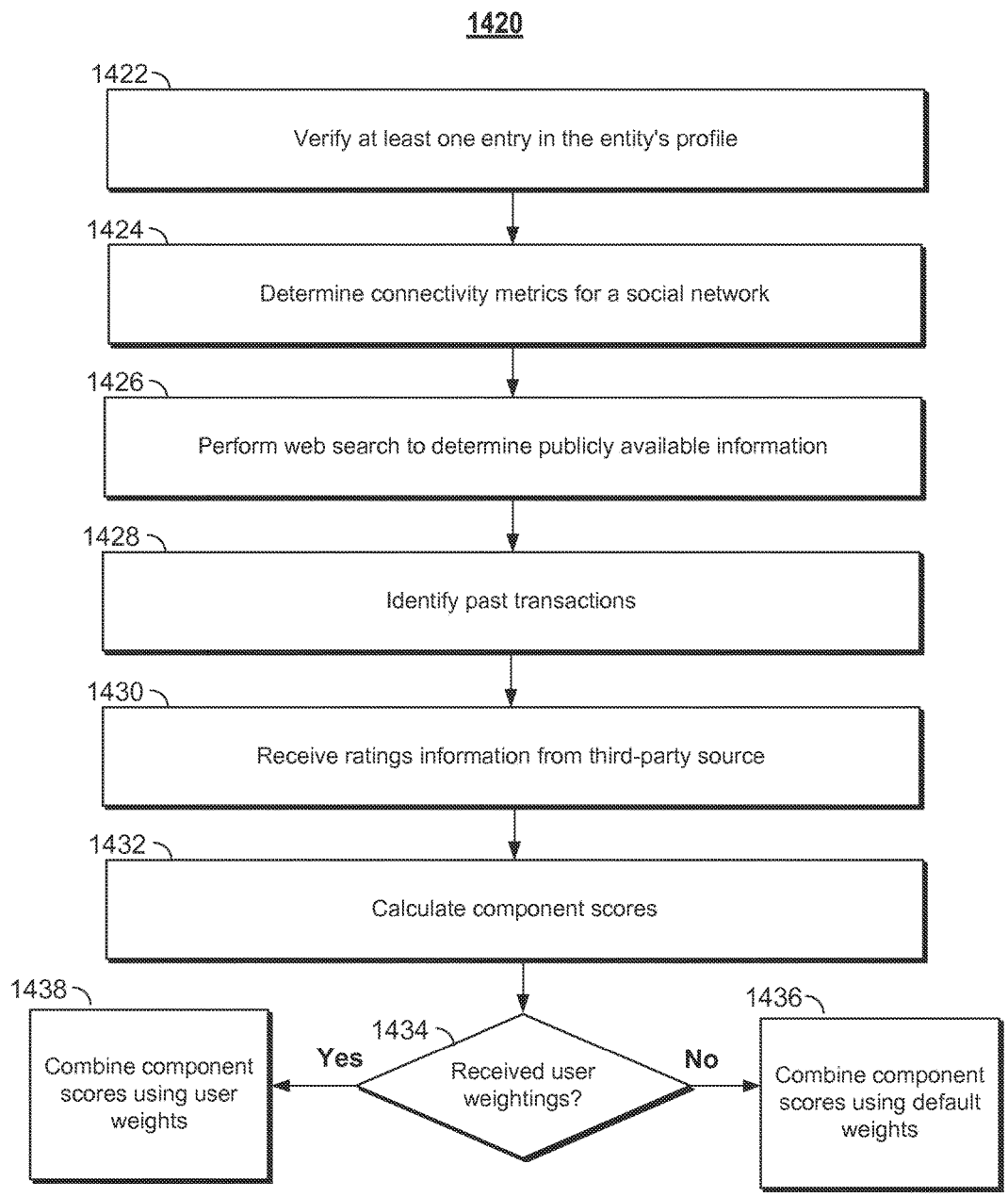
FIG. 14 is an illustrative process for calculating a system trust score.

FIG. 14 shows a process 1420 for calculating a system trust score in accordance with certain embodiments of the present disclosure. Process 1420 includes verifying at least one entry in the entity's profile at step 1422, determining connectivity metrics for a social network at step 1424, performing a web search to determine publicly available information at step 1426, identifying past transactions at step 1428, receiving ratings information from a third-party source at step 1430, calculating component scores at step 1432, determining whether user weightings have been received at step 143, combining component scores using default weights at step 1436, and combining component scores using user weights at step 1438. It will be understood that process 1420 depicts illustrative steps for calculating a system trust score, and that one or more of steps 1422-1438 may be omitted and additional steps added to process 1420 as will be apparent to those of skill in the art without departing from the scope hereof.

At step 1422, processing circuitry, such as processing circuitry of access application 102 or application server 106, may verify at least one entry in an entity's profile. The entry may be one or more pieces of verification data, such as verification data described in connection with data verification component 404 depicted in FIG. 4. For example, the processing circuitry may verify one or more of a human user's email address, phone number, mailing address, education information, employment information. At step 1424, the processing circuitry may determine connectivity metrics for a social network. The connectivity metrics may comprise metrics as discussed in connection with network connectivity component 406 depicted in FIG. 4. The connectivity metrics may include, but are not limited to, number of friends, number of posts, or number of messages. At step 1426, the processing circuitry may perform a web search to determine publicly available information associated with the entity. For example, the processing circuitry may perform search engine mining as discussed above in relation to search engine mining component 416 depicted in FIG. 4. The processing circuitry may also determine information such as the entity's credit score or available court data, as discussed above in relation to credit score component 408 and court data component 410 depicted in FIG. 4. At step 1428, the processing circuitry may identify past transactions associated with the entity. For example, the processing circuitry may identify past financial transactions that the entity has taken part in and whether the financial transactions were completed favorably (e.g., paid back a loan) or unfavorably (e.g., defaulted on a loan). At step 1430, the processing circuitry may receive ratings information from a third-party source, as discussed above in relation to ratings/feedback data component 412 depicted in FIG. 4. As an illustrative example, the processing circuitry may receive ratings from the Better Business Bureau or from an online ratings site such as Yelp about an entity. At 1432, the processing circuitry may calculate component scores based on the information received from steps 1424-1430. The processing circuitry may calculate the components scores in any suitable manner, such as the methods discussed above in FIGS. 8 and 9.

At step 1434, the processing circuitry may determine whether user-specified weightings have been received. For example, a user may have specified custom weightings through a user interface such as interface 700 depicted in FIG. 7. If user-specified weightings have been received, then the processing circuitry may combine the component scores using the user-specified weights at step 1438. If user-specified weights have not been received, then the processing circuitry may combine the component scores using default weights at step 1436, such as the default weights depicted in FIG. 5. In some embodiments, the processing circuitry may calculate the system trust score in response to a user request for the system trust score. For example, the user may press calculate button 618 depicted in FIG. 6, and in response, the processing circuitry may calculate the system trust score in substantially real-time. In other embodiments, the processing circuitry may calculate the system trust score in advance of a user request for the system trust score. In such embodiments, the processing circuitry may retrieve a pre-calculated system trust score, for example from data store 110 depicted in FIG. 1, in response to the user request for the system trust score.

Figure 15:
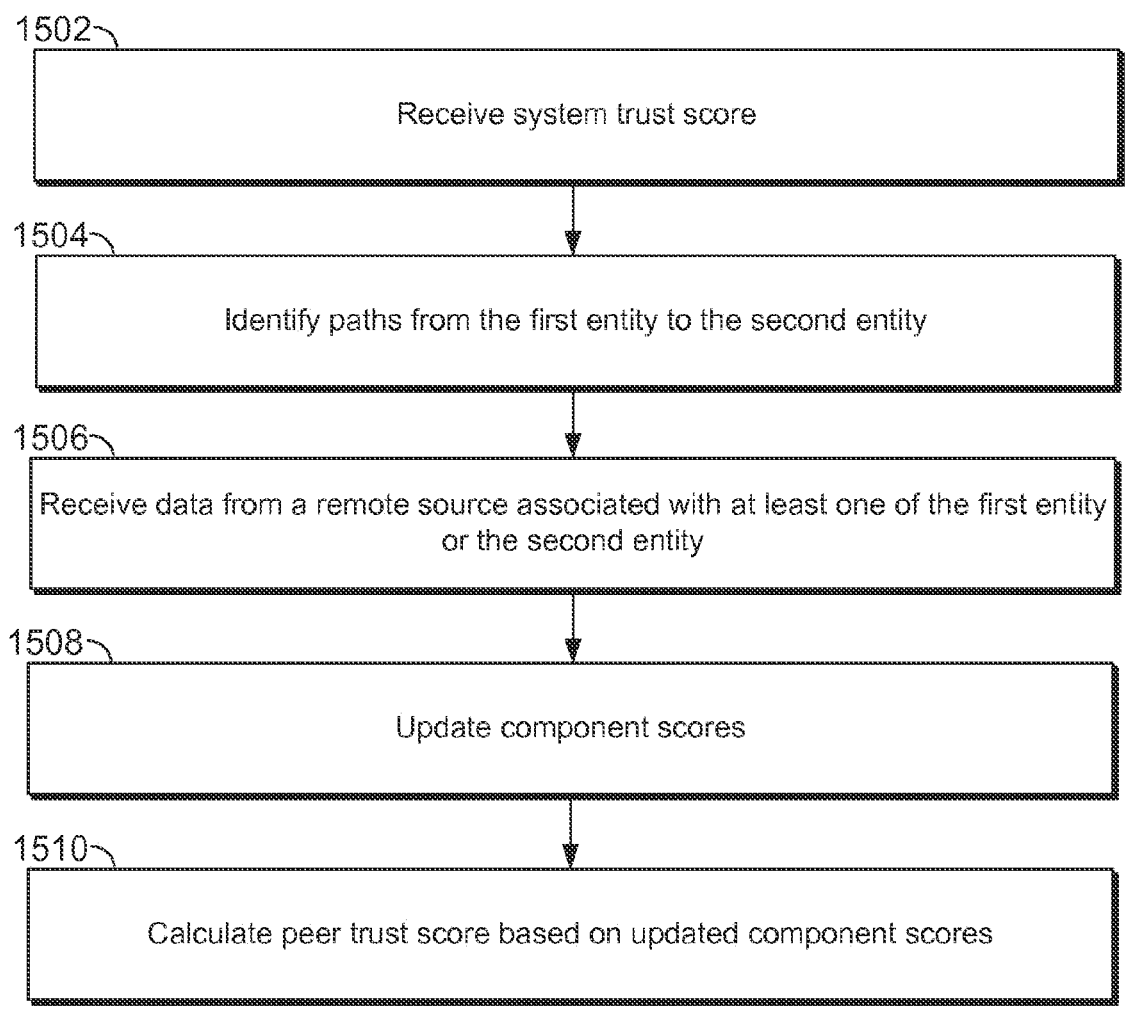
FIG. 15 is an illustrative process for calculating a peer trust score.

FIG. 15 shows a process 1500 for calculating a peer trust score in accordance with certain embodiments of the present disclosure. Process 1500 includes receiving a system trust score at step 1502, identifying paths from a first entity to a second entity at step 1504, receiving data from a remote source associated with at least one of the first entity or the second entity at step 1506, updating component scores at step 1508, and calculating a peer trust score based on the updated component scores at step 1510. It will be understood that process 1500 depicts illustrative steps for calculating a peer trust score, and that one or more of steps 1502-1510 may be omitted and additional steps added to process 1500 as will be apparent to those of skill in the art without departing from the scope hereof. For example, the process 1500 for calculating a peer trust score is depicted in FIG. 15 as an update to a system trust score. However, it will be understood that the peer trust score may be calculated from component scores independently from a system trust score, as discussed above.

At step 1502, processing circuitry, such as processing circuitry of access application 102 or application server 106, may receive a system trust score. The system trust score may have been calculated previously, such as by a method similar to process 1420 depicted in FIG. 14. At step 1504, the processing circuitry may identify paths from a first entity to a second entity. For example, the processing circuitry may utilize a path counting approach, as discussed above in relation to FIGS. 11-13. At step 1506, the processing circuitry my receive data from a remote source associated with at least one of the first entity or the second entity. For example, the processing circuitry may receive data regarding the second entity's social connections, credit score, court data, or previous transaction history with the first entity.

At step 1508, the processing circuitry may update component scores based on the information from steps 1502-1506. In some embodiments, updating component scores comprises updating less than all of the component scores that comprise the system trust score. For example, the processing circuitry may only update the network connectivity component to take into account the mutual contacts of the first entity and the second entity. Other component scores that were calculated with respect to the second entity's system trust score, such as credit score or court data, may not be affected by the additional social graph information. At step 1510, the processing circuitry may calculate the peer trust score based on the updated components by, for instance, combining the component scores using a weighted average. In some embodiments, the processing circuitry may calculate the peer trust score in response to a user request for the peer trust score. For example, the user may press calculate button 618 depicted in FIG. 6, and in response, the processing circuitry may calculate the peer trust score in substantially real-time. In other embodiments, the processing circuitry may calculate the peer trust score in advance of a user request for the peer trust score. In such embodiments, the processing circuitry may retrieve a pre-calculated peer trust score, for example from data store 110 depicted in FIG. 1, in response to the user request for the peer trust score.

Figure 16:
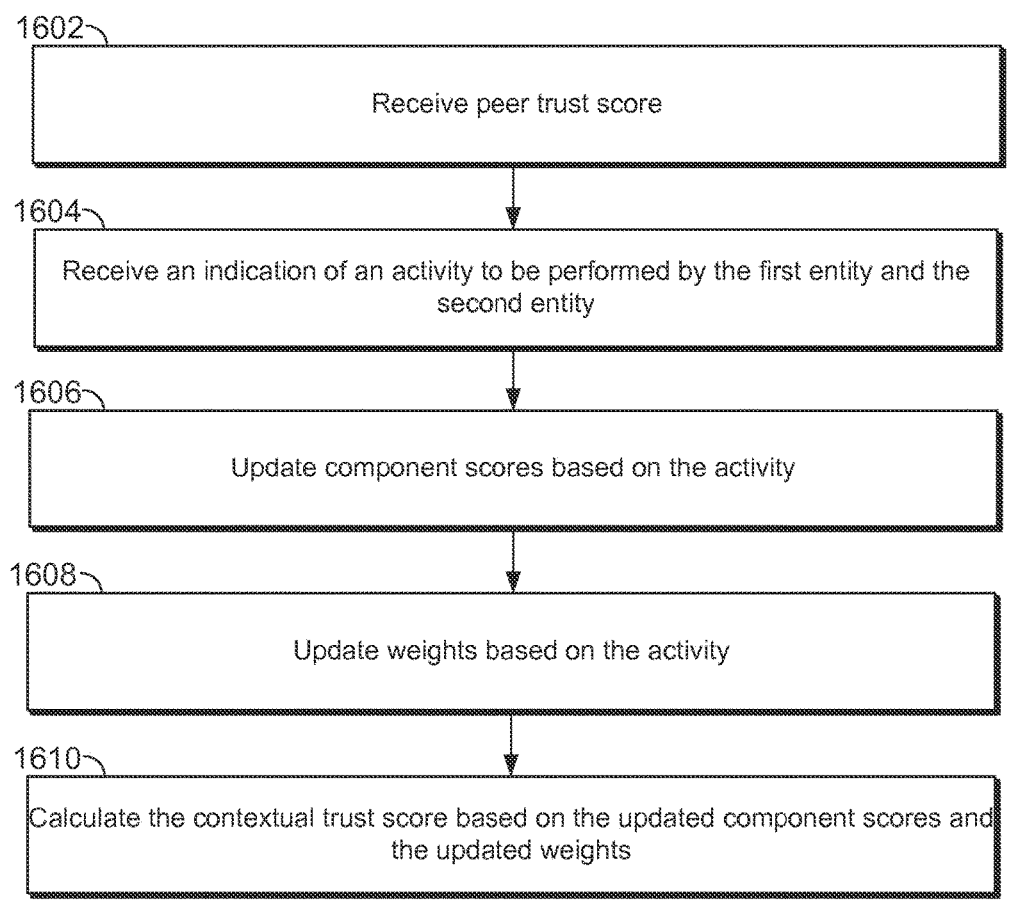
FIG. 16 is an illustrative process for calculating a contextual trust score.

FIG. 16 shows a process 1600 for calculating a contextual trust score in accordance with certain embodiments of the present disclosure. Process 1600 includes receiving a peer trust score at step 1602, receiving an indication of an activity to be performed by a first entity and a second entity at step 1604, updating component scores based on the activity at step 1606, updating weights based on the activity at step 1608, and calculating a contextual score based on the updated component scores and the updated weights at step 1610. It will be understood that process 1600 depicts illustrative steps for calculating a contextual trust score, and that one or more of steps 1602-1610 may be omitted and additional steps added to process 1600 as will be apparent to those of skill in the art without departing from the scope hereof. For example, the process 1600 for calculating a peer trust score is depicted in FIG. 16 as an update to a peer trust score. However, it will be understood that the contextual trust score may be calculated from component scores independently from a system trust score or a peer trust score, as discussed above.

At step 1602, processing circuitry, such as processing circuitry of access application 102 or application server 106, may receive a peer trust score. The system trust score may have been calculated previously, such as by a method similar to process 1500 depicted in FIG. 15. At step 1604, the processing circuitry may receive an indication of an activity to be performed by a first entity and a second entity. For example, the processing circuitry may receive the indication of the activity through transaction selector 606 depicted in FIG. 6. The processing circuitry may also receive details of the activity/transaction through transaction details field 608, as discussed above in relation to FIG. 6. At step 1606, the processing circuitry may update component scores based on the activity. For example, certain component scores may be affected by a type of transaction. As an illustrative example, the transaction history component, such as transaction history component 418 depicted in FIG. 4, may be updated to reflect only the transaction history of the particular type of transaction that is being performed by the first and second entity. At step 1608, the processing circuitry may update weights based on the activity. As discussed above in relation to FIG. 7, different transaction types may be associated with different weightings, and the components may be combined according to these different weightings. At step 1610, the processing circuitry may calculate the contextual trust score based on the updated component scores and the updated weights, for example, by taking a weighted average of the updated component scores according to the updated weights. In some embodiments, the processing circuitry may calculate the contextual trust score in response to a user request for the contextual trust score. For example, the user may press calculate button 618 depicted in FIG. 6, and in response, the processing circuitry may calculate the contextual trust score in substantially real-time. In other embodiments, the processing circuitry may calculate the contextual trust score in advance of a user request for the contextual trust score. In such embodiments, the processing circuitry may retrieve a pre-calculated contextual trust score, for example from data store 110 depicted in FIG. 1, in response to the user request for the contextual trust score.

The foregoing is merely illustrative of the principles of the disclosure, and the systems, devices, and methods described herein are presented for purposes of illustration, and not of limitation. Variations and modifications will occur to those of skill in the art after reviewing this disclosure. The disclosed features may be implemented, in any combination and subcombination (including multiple dependent combinations and subcombinations), with one or more other features described herein. The various features described or illustrated above, including any components thereof, may be combined or integrated in other systems. Moreover, certain features may be omitted or not implemented. Examples, changes, substitutions, and alterations ascertainable by one skilled in the art can be made without departing from the scope of the information disclosed herein.

What is claimed is:

1. A method, comprising:
   determining, by a system comprising a processor, a trust score for a first entity reflective of a first degree of trustworthiness of the first entity without any relation to a second entity based on a first set of weights applied to values for trust valuation components, wherein the determining the trust score comprises:
      accessing, by the system via a network, one or more external data sources comprising information about the first entity related to the trust valuation components; and
      determining, by the system, the values for the trust valuation components based on the information;
   receiving, by the system, activity information indicating an activity for potential performance between the first entity and the second entity;
   determining, by the system, updated values for the trust valuation components based on one or more relations between the first entity and the second entity, wherein the one or more relations comprise one or more connections between the first entity and the second entity in one or more network communities;
   determining, by the system, a second set of weights for the trust valuation components based on relevance to the activity and the second entity; and
   determining, by the system prior to performance of the activity, an updated trust score for the first entity reflective of a second degree of trustworthiness of the first entity based on the updated values for the trust valuation components and the second set of weights, wherein the second degree of trustworthiness indicates a recommended degree of trust the second entity should have for the first entity in association with proceeding with the performance of the activity.

2. The method of claim 1, wherein the determining the updated values further comprises determining the updated values based on the activity.

3. The method of claim 1, wherein the determining the second set of weights comprises determining the second set of weights based on a type of the first entity or the second entity.

4. The method of claim 1, wherein the determining the second set of weights comprises determining the second set of weights based on a relationship between the first entity and the second entity.

5. The method of claim 1, further comprising:
   controlling, by the system, authorization for the performance of the activity based on the updated trust score relative to a threshold trust score.

6. The method of claim 1, wherein the activity comprises a financial transaction, wherein the receiving the activity information comprises receiving valuation information reflective of a valuation of the financial transaction, and wherein the determining the second set of weights comprises determining the second set of weights based on the valuation.

7. The method of claim 1, wherein the trust valuation components are selected from a group comprising: a data verification component, a network connectivity component, a credit score component, a core data component, a ratings/feedback component, a group/demographics component, a search engine mining component, and a transaction history component.

8. The method of claim 1, further comprising:
   determining, by the system, a location associated with the first entity or the activity, and wherein the determining the updated trust score further comprises determining the updated trust score based on the location.

9. The method of claim 8, wherein the determining the updated trust score comprises adjusting the trust score to reflect a degree of danger associated with the location.

10. The method of claim 1, wherein the trust valuation components comprise a transaction history component and wherein the determining the updated values comprises recalculating a weight for the transaction history component based on transaction history data regarding transactions between the first entity and the second entity.

11. The method of claim 1, wherein the trust valuation components comprise a transaction history component and wherein the determining the updated values comprises recalculating a value for the transaction history component based on transaction history data associated with the activity.

12. The method of claim 1, wherein the second entity comprises a human and wherein the determining the updated trust score further comprises determining the updated trust score based on biological response information that reflects a biological response generated by the second entity in association with determining whether to proceed with the performance of the activity.

13. A system, comprising:
   a processor; and
   a memory that stores executable instructions that, when executed by the processor, facilitate performance of operations, comprising:
      determining a trust score for a first entity reflective of a first degree of trustworthiness of the first entity without any relation to a second entity based on a first set of weights applied to values for trust valuation components, wherein the determining the trust score comprises:
         accessing one or more network accessible data sources comprising information about the first entity related to the trust valuation components; and determining, by the system, the values for the trust valuation components based on the information;

receiving activity information indicating an activity for potential performance between the first entity and the second entity;

determining updated values for the trust valuation components based on one or more relations between the first entity and the second entity, wherein the one or more relations comprise one or more connections between the first entity and the second entity in one or more network communities;

determining a second set of weights for the trust valuation components based on relevance to the activity and the second entity; and determining, by the system prior to performance of the activity, an updated trust score for the first entity reflective of a second degree of trustworthiness of the first entity based on the updated values for the trust valuation components and the second set of weights, wherein the second degree of trustworthiness indicates a recommended degree of trust the second entity should have for the first entity in association with proceeding with the performance of the activity.

14. The system of claim 13, wherein the determining the updated values further comprises determining the updated values based on the activity.

15. The system of claim 13, wherein the determining the second set of weights comprises determining the second set of weights based on a type of the first entity or the second entity.

16. The system of claim 13, wherein the determining the second set of weights comprises determining the second set of weight based on a relationship between the first entity and the second entity.

17. The system of claim 13, wherein the operations further comprise:
controlling authorization for the performance of the activity based on the updated trust score relative to a threshold trust score.

18. The system of claim 13, wherein the activity comprises a financial transaction, wherein the receiving the activity information comprises receiving valuation information reflective of a valuation of the financial transaction, and wherein the determining the second set of weights comprises determining the second set of weights based on the valuation.

19. The system of claim 13, wherein the trust valuation components are selected from a group comprising: a data verification criterion, a network connectivity criterion, a credit score criterion, a core data criterion, a ratings/feedback criterion, a group/demographics criterion, a search engine mining criterion, and a transaction history criterion.

20. The system of claim 13, wherein the operations further comprise:
determining a location associated with the first entity or the activity, and wherein the determining the updated trust score further comprises determining the updated trust score based on the location.

21. The system of claim 20, wherein the determining the updated trust score comprises adjusting the trust score to reflect a degree of danger associated with the location.

22. The system of claim 13, wherein the activity comprises a hiring for employment.

23. The system of claim 22, wherein the trust valuation components comprise a transactional history component and wherein the determining the updated values comprises recalculating a value for the transactional history component of the one or more components that accounts for based on an employment history of the first entity or the second entity.

24. The system of claim 13, wherein the second entity comprises a human and wherein the determining the updated trust score further comprises determining the updated trust score based on biological response information that reflects a biological response generated by the second entity in association with determining whether to proceed with the performance of the activity.

25. A non-transitory machine-readable storage medium, comprising executable instructions that, when executed by a processor, facilitate performance of operations, comprising:
determining a trust score for a first entity reflective of a first degree of trustworthiness of the first entity without any relation to a second entity based on first weights applied to first values for trust valuation components, wherein the determining comprises:
accessing, via a network, one or more external data sources comprising information about the first entity related to the trust valuation components; and
determining the values for the trust valuation components based on the information;

receiving activity information indicating an activity for potential performance between the first entity and the second entity;

determining updated values for the trust valuation components based on one or more relations between the first entity and the second entity, wherein the one or more relations comprise one or more connections between the first entity and the second entity in one or more network communities;

determining second weights for the trust valuation components based on relevance to the activity and the second entity; and determining, prior to performance of the activity, an updated trust score for the first entity reflective of a second degree of trustworthiness of the first entity based on the updated values for the trust valuation components and the second weights, wherein the second degree of trustworthiness indicates a recommended degree of trust the second entity should have for the first entity in association with proceeding with the performance of the activity.

26. The non-transitory machine-readable storage medium of claim 25, wherein the determining the updated values further comprises determining the updated values based on the activity.

27. The non-transitory machine-readable storage medium of claim 25, wherein the determining the second weights comprises determining the second weights based on a type of the first entity or the second entity.

28. The non-transitory machine-readable storage medium of claim 25, wherein the determining the second weights comprises determining the second weights based on a relationship between the first entity and the second entity.

29. The non-transitory machine-readable storage medium of claim 25, wherein the operations further comprise:
controlling authorization for the performance of the activity based on the updated trust score relative to a threshold trust score.

30. The non-transitory machine-readable storage medium of claim 25, wherein the activity comprises a financial transaction, wherein the receiving the activity information comprises receiving valuation information reflective of a valuation of the financial transaction, and wherein the determining the second weights comprises determining the second weights based on the valuation.

\* \* \* \* \*